(12) United States Patent
Park

(10) Patent No.: US 10,880,925 B2
(45) Date of Patent: Dec. 29, 2020

(54) METHOD AND APPARATUS FOR PERFORMING RANDOM ACCESS

(71) Applicant: Innovative Technology Lab Co., Ltd., Seoul (KR)

(72) Inventor: Dong Hyun Park, Seoul (KR)

(73) Assignee: INNOVATIVE TECHNOLOGY LAB CO., LTD., Seoul (KR)

(*) Notice: Subject to any disclaimer, the term of this patent is extended or adjusted under 35 U.S.C. 154(b) by 0 days.

(21) Appl. No.: 16/273,589

(22) Filed: Feb. 12, 2019

(65) Prior Publication Data

US 2019/0254071 A1 Aug. 15, 2019

(30) Foreign Application Priority Data

Feb. 14, 2018 (KR) .................. 10-2018-0018724

(51) Int. Cl.
| | |
|---|---|
| *H04W 74/08* | (2009.01) |
| *H04W 76/11* | (2018.01) |
| *H04W 72/04* | (2009.01) |
| *H04W 72/12* | (2009.01) |
| *H04L 5/00* | (2006.01) |

(52) U.S. Cl.
CPC ......... *H04W 74/0816* (2013.01); *H04L 5/005* (2013.01); *H04W 72/042* (2013.01); *H04W 72/1289* (2013.01); *H04W 76/11* (2018.02)

(58) Field of Classification Search
CPC .... H04L 5/0053; H04L 5/005; H04W 74/006; H04W 74/0816; H04W 74/11; H04W 74/0833; H04W 72/1289; H04W 72/042; H04W 76/11

USPC ........................................................ 370/315
See application file for complete search history.

(56) References Cited

U.S. PATENT DOCUMENTS

| | | | |
|---|---|---|---|
| 8,493,917 B2 | 7/2013 | Meyer et al. | |
| 9,253,802 B2 | 2/2016 | Pelletier et al. | |
| 9,756,658 B2 * | 9/2017 | Desai .................. | H04W 74/04 |
| 10,701,684 B2 * | 6/2020 | Yoo .................. | H04W 74/0833 |

(Continued)

FOREIGN PATENT DOCUMENTS

| | | |
|---|---|---|
| WO | 2012135998 A1 | 10/2012 |
| WO | 2013022451 A1 | 2/2013 |

OTHER PUBLICATIONS

International Search Report(PCT/KR2019/001742).

(Continued)

*Primary Examiner* — Jianye Wu

(57) ABSTRACT

Systems, apparatuses, and methods for wireless communications are provided. A method may comprise receiving, by a wireless device from a base station, one or more messages comprising downlink control information (DCI) associated with a DCI format; determining that a first field of the DCI corresponds to a predefined value; determining that, based on the first field corresponding to the predefined value, the DCI is for a random access procedure associated with a physical downlink control channel (PDCCH) order; determining, based on the determining that the DCI is for a random access procedure associated with a PDCCH order and based on a plurality of fields of the DCI, a random access channel (RACH) occasion; and transmitting, based on the RACH occasion, a random access preamble.

21 Claims, 8 Drawing Sheets

(56) References Cited

U.S. PATENT DOCUMENTS

2019/0200248 A1* 6/2019 Basu Mallick ...... H04B 7/0695
2019/0215706 A1* 7/2019 Tsai .................... H04W 72/042

OTHER PUBLICATIONS

Written Opinion of the International Searching Authority(PCT/KR2019/001742).
Notification of Transmittal of the International Search Report and the Written Opinion of the International Searching Authority, or the Declaration(PCT/KR2019/001742).
"3rd Generation Partnership Project; Technical Specification Group Radio Access Network; NR; Multiplexing and channel coding (Release 15)", 3GPP TS 38.212 V15.0.0, Dec. 2017, pp. 1-82, 3GPP Organizational Partners.
"3rd Generation Partnership Project; 3rd Generation Partnership Project; Technical Specification Group Radio Access Network; NR; Medium Access Control (MAC) protocol specification (Release 15)", 3GPP TS 38.321 V15.0.0, Dec. 2017, pp. 1-55, 3GPP Organizational Partners.

* cited by examiner

METHOD AND APPARATUS FOR PERFORMING RANDOM ACCESS

CROSS-REFERENCE TO RELATED APPLICATION

This application claims priority from and the benefit of Korean Patent Application No. 10-2018-0018724 filed on Feb. 14, 2018, which is hereby incorporated by reference in its entirety.

BACKGROUND

1. Field

The present disclosure relates to wireless communications. A message (e.g., a physical downlink control channel (PDCCH) order) may be used for a random access procedure available for an initial system access and/or various purposes (e.g., uplink synchronization (UL sync), handover, beam failure recovery, radio resource recovery (RRC) establishment, etc.) in a new radio (NR) system.

2. Discussion of the Background

The IMT (International Mobile Telecommunication) frameworks and standards have been developed by ITU (International Telecommunication Union) and, recently, the 5th generation (5G) communication has been discussed through a program called "IMT for 2020 and beyond".

In order to satisfy requirements from "IMT for 2020 and beyond", the discussion is in progress about a way for enabling the 3rd Generation Partnership Project (3GPP) New Radio (NR) system to support various numerologies by taking into consideration various scenarios, various service requirements, potential system compatibility.

Also, the NR system considers transmission of a physical signal/channel through a plurality of beams to overcome a poor channel environment, such as high pathloss occurring in a relatively high carrier frequency, phase-noise, and frequency offset.

SUMMARY

Systems, apparatus, and methods are described for wireless communications. A downlink control information (DCI) format about a physical downlink control channel (PDCCH) order may be determined by a base station, for example, an evolved node base (eNode B). Signaling schemes for initializing a new radio contention free random access (NR CFRA) are described.

The present disclosure also provides a method and apparatus of determining DCI format including control information for initializing a CFRA.

The present disclosure also provides a method and apparatus of setting a DCI format that may provide a user equipment (UE) with control information different from control information used for general data scheduling.

A method may comprise receiving, by a wireless device from a base station, one or more messages comprising downlink control information (DCI) associated with a DCI format; determining that a first field of the DCI corresponds to a predefined value; determining that, based on the first field corresponding to the predefined value, the DCI is for a random access procedure associated with a physical downlink control channel (PDCCH) order; determining, based on the determining that the DCI is for a random access procedure associated with a PDCCH order and based on a plurality of fields of the DCI, a random access channel (RACH) occasion; and transmitting, based on the RACH occasion, a random access preamble.

A method may comprise determining, by a base station, a random access channel (RACH) occasion for a wireless device, the RACH occasion being associated with a synchronization signal/physical broadcast channel (SS/PBCH) block; generating downlink control information (DCI) corresponding to a DCI format, the DCI comprising: a first field having a predefined value indicating that the DCI is for a random access procedure associated with a physical downlink control channel (PDCCH) order; an SS/PBCH block index field having a value indicating the SS/PBCH block; and an index field having a value indicating one or more RACH occasions, the RACH occasion for the wireless device being indicated by the values of the SS/PBCH block index field and the index field; transmitting, to the wireless device, the DCI; and receiving, from the wireless device and based on the RACH occasion, a random access preamble.

A method may comprise receiving, by a wireless device from a base station, one or more messages comprising downlink control information (DCI); determining that the DCI corresponds to DCI format 1_0; determining that, based on a first field of the DCI format 1_0, the DCI is for a random access procedure associated with a physical downlink control channel (PDCCH) order; determining, based on a synchronization signal/physical broadcast channel (SS/PBCH) block index field of the DCI and based on an index field associated with one or more random access channel (RACH) occasions, a RACH occasion; and transmitting, based on the RACH occasion, a random access preamble.

A DCI format comprising control information of a CFRA initialization may be provided. A base station may indicate transmission resources for a preamble for the CFRA based on the control information of the DCI format.

DETAILED DESCRIPTION

Figure 1:
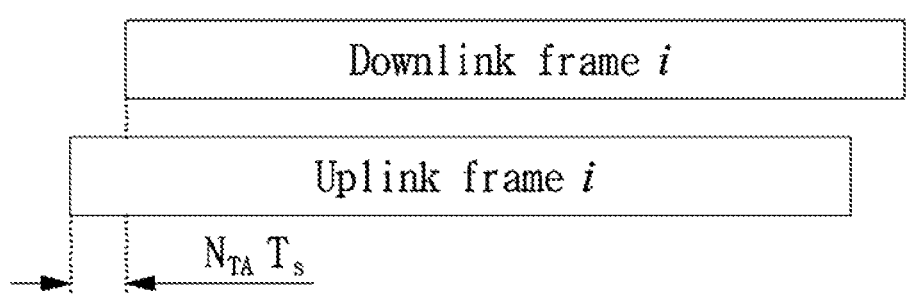
FIG. 1 illustrates an example of a method of determining an uplink transmission timing based on a downlink reception timing.

Various examples will be described more fully hereinafter with reference to the accompanying drawings. Throughout the drawings and the detailed description, unless otherwise described, the same drawing reference numerals are understood to refer to the same elements, features, and structures. In describing the examples, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. In contrast, when an element is referred to as being "directly on," "directly connected to" or "directly coupled to" another element, there are no intervening elements present.

In the described exemplary system, although methods are described based on a flowchart as a series of steps or blocks, aspects of the present disclosure are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present disclosure. When an implementation is embodied as software, the described scheme may be embodied as a module (process, function, or the like) that executes the described function. The module may be stored in a memory and may be executed by a processor. The memory may be disposed inside or outside the processor and may be connected to the processor through various well-known means.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, a system to which various examples of the present disclosure are applied may be referred to as a New Radio (NR) system to be distinguished from other existing systems. The NR system may include one or more features defined by TS38 series of the third partnership project (3GPP) specification. However, the scope of the present disclosure is not limited thereto or restricted thereby. In addition, although the term 'NR system' is used herein as an example of a wireless communication system capable of supporting a variety of subcarrier spacings (SCSs), the term 'NR system' is not limited to the wireless communication system for supporting a plurality of subcarrier spacings.

FIG. 1 illustrates an example of describing a timing between a downlink frame and an uplink frame.

Referring to FIG. 1, a timing or a time structure between a downlink frame for downlink transmission and an uplink frame for uplink transmission has $T_f=(\Delta f_{max}N_f/100) \cdot T_s=10$ ms. Here, ten subframes corresponding to $T_{sf}=(\Delta f_{max}N_f/1000) \cdot T_s=1$ ms constitute a single frame. A transmission timing of an uplink frame i is determined by a UE according to $T_{TA}=N_{TA}T_s$ based on a reception timing of a downlink frame i. Here, a value of $N_{TA}$ denotes a TA value indicated by an eNode B and $T_s$ denotes a minimum time unit sample of an NR system.

Figure 2:
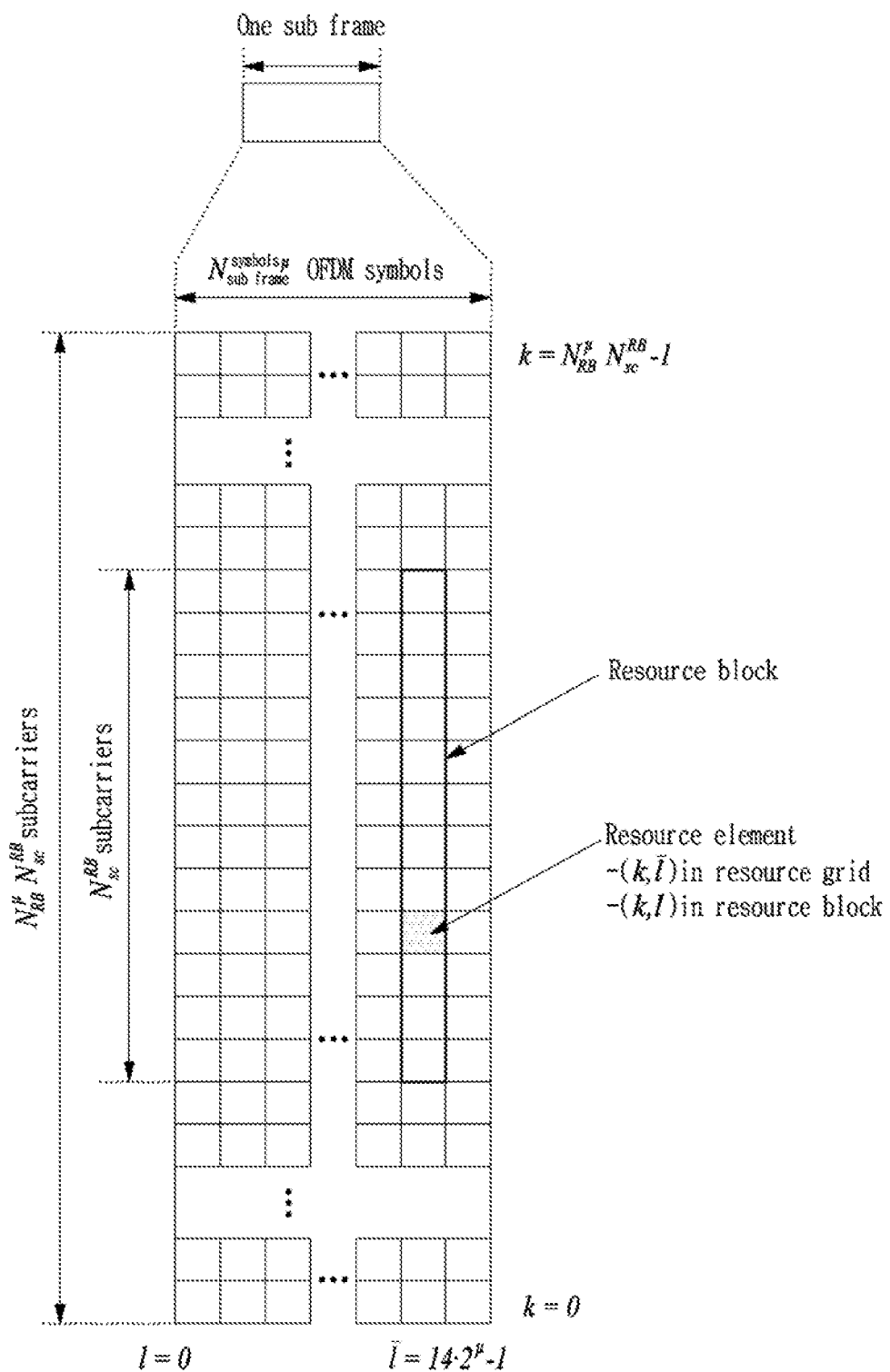
FIG. 2 illustrates an example of a resource grid and a resource block.

FIG. 2 illustrates an example of a resource grid and a resource block according to an embodiment.

Referring to FIG. 2, a resource element within a resource grid is indexed based on each subcarrier spacing. A single resource grid may be generated per subcarrier spacing of each antenna port and uplink/downlink (UL/DL) transmission and reception may be performed based on the corresponding resource grid.

A single resource block is configured on a frequency domain using 12 resource elements ($N_{sc}^{RB}=12$) and configures an index $n_{PRB}$ for a single resource block every 12 resource elements. An index of the resource block may be used in a specific frequency band or system bandwidth. Here, $n_{PRB}$ may be represented as the following Equation 1.

$$n_{PRB} = \left\lfloor \frac{k}{N_{sc}^{RB}} \right\rfloor \quad \text{[Equation 1]}$$

Also, for example, numerologies may be defined based on a subcarrier spacing, a cyclic prefix (CP) length, a number of orthogonal frequency division multiplexing (OFDM) symbols per slot, etc., in an OFDM system, as shown in Table 1. Since the NR system is to be designed to meet various services and requirements, the numerologies that define resources of a physical layer may be variously configured and are not limited to the aforementioned embodiment.

TABLE 1

| µ | $\Delta f = 2^\mu \cdot 15$ [kHz] | Cyclic Prefix (CP) |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

A normal slot may be defined as a basic time unit used to transmit a single piece of data and control information in the NR system. A length of the normal slot may basically include 14 OFDM symbols. Dissimilar to a slot, a subframe may have an absolute time length corresponding to 1 ms in the NR system and may be used as a reference time for a length of another time section. For example, a time section, such as a long term evolution (LTE) subframe for coexistence of LTE and NR, may be required for an NR standard.

A non-slot refers to a slot having a number of symbols less by at least one symbol than that of the normal slot and is introduced to basically provide a low delay time of a ultra-reliable and low latency communications (URLLC) service. For example, a non-slot with a length of 1 OFDM symbol may be considered based on a frequency range, for example, in a frequency range of 60 gigahertz (GHz) or more. However, a number of OFDM symbols used to define the non-slot may include at least two OFDM symbols and the range thereof may be configured with a mini-slot length up to a normal slot length −1. Generally, the range thereof is limited to 2, 4, or 7 symbols.

In the case of a number $N_{slot}^{sy\ mb,\ \mu}$ of OFDM symbols per slot according to each subcarrier spacing setting μ and a normal CP, the following Table 2, similar to Table 1, provides a number of OFDM symbol per slot according to each subcarrier spacing value, a number of slots per frame, and a number of slots per subframe based on 14 normal slots.

TABLE 2

| μ | $N_{symbol}^{slot}$ | $N_{slot}^{frame,u}$ | $N_{slot}^{subframe,u}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Also, in the case of the number $N_{slot}^{sy\ mb,\ \mu}$ of OFDM symbols per slot according to each subcarrier spacing setting μ and an extended CP, the following Table 3, similar to Table 2, provides the number of symbols per slot, the number of slots per frame, and the number of slots per subframe based on 12 normal slots in the case of the extended CP that follows 60 kHz subcarrier spacing corresponding to μ=2.

Figure 3:
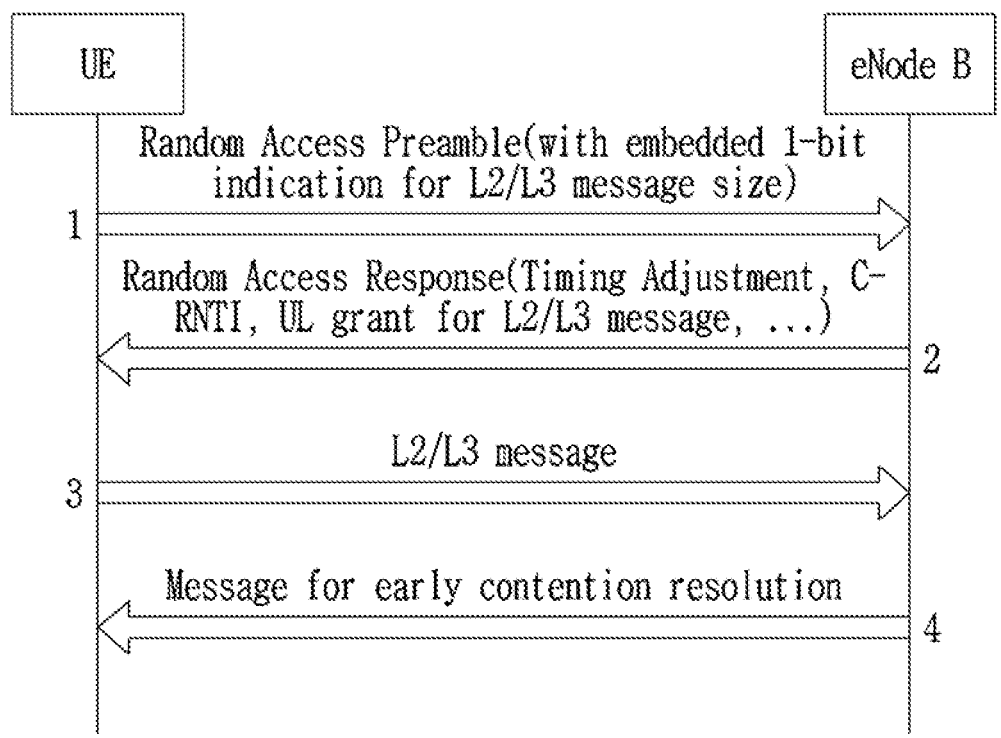
FIG. 3 illustrates an example of a contention-based random access procedure in a new radio (NR) system.

FIG. 3 illustrates an example of a contention-based random access procedure in a new radio (NR) system according to an embodiment.

Here, referring to FIG. 3, in the NR system, the contention-based random access procedure may be performed in order of the following Step 1 to Step 4:
Step 1: Preamble transmission;
Step 2: Random access response;
Step 3: Layer 2/Layer 3 (L2/L3) message;
Step 4: Contention resolution message.

Here, the aforementioned random access (RA) procedure is initiated by the following trigger event and an initialization operation corresponding thereto. For example, a contention-free random access (CFRA) procedure performs only the aforementioned Step 1 and Step 2. That is, since the CFRA procedure is not a contention-based procedure, the aforementioned Step 3 and Step 4 are not required. Herein, a preamble transmission represents a transmission of a preamble and thus, a plurality of preamble transmissions also represents transmissions of a plurality of preambles.

For example, initialization of the RA procedure may be performed as follows:
PDCCH order,
MAC sublayer,
RRC sublayer, or
Beam failure (BF) indication from PHY.

A relationship between a cause that triggers a random access of the NR system and a corresponding event may be represented by the following Table 3:

TABLE 3

| Event | Initiated by | Note |
|---|---|---|
| Initial access from RRC_IDLE | MAC sublayer | RRCConnectionRequest triggers R-BSR |
| RRC Connection Re-establishment | MAC sublayer | RRCConnectionReestablishmentRequest triggers R-BSR |
| Handover | MAC sublayer | RRCConnectionReconfigurationComplete triggers R-BSR |
| DL data arrival | PDCCH order | NW triggers random access |
| UL data arrival | MAC sublayer | New data arrival triggers R-BSR |
| Positioning | PDCCH order | NW triggers random access |
| PSCell management | RRC sublayer | R-BSR triggered by RRCConnectionReconfigurationComplete does not initiate random access in PSCell |
| STAG management | PDCCH order | NW triggers random access in SCell |
| Beam Failure | Beam Failure indication | BF indication from a lower layer |
| On demand SI | MAC sublayer | RRC trigger R-BSR |

Here, the RA procedure on SCell excluding a PSCell (a primary cell in a master cell group (MCG) or a secondary cell group (SCG) for dual-connectivity) is initialized with an RA preamble index value indicated by PDCCH order by the PDCCH order only.

Also, the following information may be provided to UEs through RRC signaling.
Prach-ConfigIndex: indicates a set of available PRACH resources for preamble transmission;
RA-PreambleInitialReceivedTargetPower: indicates initial preamble power;
RSRP-ThresholdSSB: indicates a selection of associated preamble resource and index based on a sync signal block (SSB) reference signal received power (RSRP) value, csirs-dedicatedRACH-Threshold: indicates a selection of associated preamble resource and index based on a CSI-RS RSRP value, and sul-RSRP-Threshold: an RSRP threshold for the selection of the SS block and corresponding PRACH resource;
RA-PreamblePowerRampingStep: indicates a power-ramping factor;
RA-PreambleIndex: indicates a random access preamble index;
RA-PreambleTx-Max: indicates transmission of the maximum number of preambles.

Also, a preamble index group and indices included in the corresponding group may be sequentially assigned per SSB depending on whether a mapping relationship between a preamble transmission resource and an index is preset per SSB. The preamble group is used for an eNode B to estimate a size of UL resource required for msg.3 transmission. That is, when preamble groups A and B are set to a UE, the UE selects a preamble index in the group B and transmits a preamble during an RA procedure corresponding to a specific msg.3 size (ra-Msg3 SizeGroupA) or more. When the eNode B verifies that the preamble of the group B is received, the eNode B includes size information of the UL resource required for msg.3 transmission in msg.2 that is response information for the preamble and perform scheduling for the UE.

Size of RA window: is indicated to the UE by a number of slots

Preamble index set and for SI request and corresponding PRACH resource (if necessary)

Beam failure request response window and corresponding PRACH resource (if necessary)

bfr-ResponseWindow: indicates a time window to monitor response(s) on beam failure recovery request Ra-ContentionResolutionWindow: indicates a size of a time window to monitor an RA response.

To initialize the RA procedure, the UE empties an msg.3 buffer, sets a preamble transmission counter to 1, sets a preamble power ramping counter to 1, and sets a preamble back-off to 0 ms. If a carrier on which the RA procedure is to be performed is explicitly signaled, the UE performs the RA procedure on the corresponding carrier. Otherwise, if a supplement uplink (SUL) cell is set as a cell for the RA procedure and an RSRP value of DL pathloss of the corresponding cell is less than a sul-RSRP threshold, the UE selects the SUL cell as a carrier for performing the RA procedure and sets a PCMAX value for a normal carrier.

The UE sets a preamble index value through a resource selection procedure and determines a related next available PRACH occasion. In detail, a method of determining a PRACH occasion determines the PRACH occasion based on a case in which a correlation setting between an SSB block index and the PRACH occasion is present, a case in which a correlation setting between CSI-RS and the PRACH occasion is present, or a case in which the correlation settings are not provided to the UE. If the correlation setting between the SSB or CIS-RS and the PRACH occasion is present, a related PRACH occasion is determined based on SSB or CSI-RS selected by the UE. Conversely, if the correlation setting is absent, the UE performs a preamble transmission in the next available PRACH occasion.

The UE performs a preamble transmission based on the selected PRACH occasion, and a MAC layer provides a selected preamble, a related radio network temporary identifier (RNTI) value, a preamble index, and received power to a PHY layer to perform transmission of the selected preamble. In this manner, the UE needs to monitor reception of msg2 (random access response (RAR)) information corresponding to the transmitted preamble. Such a time section is defined as an RA window. After a desired number of symbols in which the preamble is transmitted, the UE desires to receive RAR (msg.2) and performs monitoring of PDCCH/PDSCH (for msg.2) based on an RA-RNTI value during a period of time corresponding to the RA window. If response information (RAPID) is included in the received msg.2, the UE determines that reception of the RAR is a success. Otherwise, the UE performs again the preamble resource selection procedure to prepare for a preamble retransmission.

The UE performs msg.3 transmission based on scheduling in the received msg.2 and parameter information for the msg.3 transmission. Once the msg.3 transmission is performed, the UE initiates a contention resolution timer and performs monitoring of PDCCH (with C-RNTI) for receiving msg.4 during an operation of the corresponding timer. If msg4 is received, the UE determines that the contention resolution is successfully performed.

Hereinafter, a method of designing a downlink control information (DCI) format for PDCCH order through eNode B signaling for initializing an NR CFRA will be described based on the aforementioned description.

Although the following description is made based on each individual embodiment, it is provided as an example only and the following embodiments may be combined and thereby applied.

Embodiment 1

A DCI format about PDCCH order may be designed through eNode B signaling for initializing an NR CFRA.

In an NR system, an eNode B may instruct the UE to initialize and then perform a RA procedure through PDCCH signaling as signaling for initialization of the CFRA. The eNode B transmits a DCI format in the PDCCH. Here, control information for initialization of the CFRA is present in the corresponding DCI format and control information different from control information used for general data scheduling is transmitted to the UE using the corresponding DCI format. However, to prevent an increase in a number of times the UE performs PDCCH blind decoding, a number of bits of the PDCCH DCI format for the CFRA may be identical to a size of a fallback DCI format for transmitting a single transport block (TB).

Here, the aforementioned fallback DCI format refers to a DCI format available when a UE channel environment is poor in a transmission mode set for downlink or uplink data scheduling. That is, the fallback DCI format is not a DCI format used to transmit a large amount of data such as multiple input and multiple output (MIMO) and thus, includes a relatively small number of bits. Also, only control information for minimum data scheduling is present within the corresponding fallback DCI format. The corresponding fallback DCI may include DCI format 0_0 (downlink transmission) and DCI format 1_0 (uplink transmission).

Hereinafter, it is assumed that a size of the DCI format transmitted in PDCCH order for indicating the initialization of the CFRA proposed herein is identical to a size of the fallback DCI (e.g., DCI format 0_0 or DCI format 1_0). Accordingly, in the NR system, the DCI format for PDCCH order may be configured based on the fallback DCI format. Hereinafter, features and embodiments of the DCI format of PDCCH order for the NR system will be described. A DCI format cyclic redundancy check (CRC) for PDCCH order may be scrambled with a C-RNTI value and may be indicated to the UE by the eNode B based on one of the following embodiments.

Table 4 shows DCI format 0_0 and DCI format 1_0 based on the NR fallback DCI format.

TABLE 4

| | DCI format 0_0 (UL) | DCI format 1_0 (DL) |
|---|---|---|
| Identifier for DCI formats | 1 bit | 1 bit |
| Frequency domain resource assignment | $\lceil \log_2(N_{RB}^{UL,BWP}(N_{RB}^{UL,BWP}+1)/2) \rceil$ | $\lceil \log_2(N_{RB}^{DL,BWP}(N_{RB}^{DL,BWP}+1)/2) \rceil$ |
| Time domain resource assignment | X bits | X bits |
| Frequency hopping flag | 1 bit | 1 bit |
| Modulation and coding scheme | 5 bits | 5 bits |
| New data indicator | 1 bit | 1 bit |
| Redundancy version | 2 bits | 2 bits |
| HARQ process number | 4 bits | 4 bits |
| TPC command for scheduled PUSCH | 2 bits | x |
| Downlink assignment index | x | 2 bits |
| TPC command for scheduled PUCCH | x | 2 bits |
| PUCCH resource indicator | x | 2 bits |
| PDSCH-to-HARQ_feedback iming indicator | x | 3 bits |
| UL/SUL indicator | 1 bit (in Padding bits) | x |

Referring to Table 4, in the NR system, the fallback DCI format uses a field about the above control information for data scheduling. To fit a relatively small size of a DCI format for a relatively great size of a DCI format among corresponding fallback DCI formats, a zero value is added as a padding bit. When the padding bit is added in DCI format 0_0, the added padding bit may be used as a 1 bit for UL/SUL indicator.

Assuming the DCI format for PDCCH order based on the same size as that of the fallback DCI format, the following fields may be generated. Also, an additional resource assignment method for a plurality of CFRA preamble transmissions is proposed herein.

The DCI format for PDCCH order (based on the fallback DCI format) may be used as follows:

Carrier Indicator—0 or ¾ Bits

If cross-carrier scheduling is set to the UE, a corresponding field may be enabled with 3 or 4 bits, and otherwise, 0 bit. Alternatively;

Regardless of whether cross-carrier scheduling is set to the UE, the DCI format for PDCCH order indicates a preamble transmission in the same serving cell as that in which only the PDCCH is transmitted. Accordingly, in this case, "carrier indicator" field is absent. According to this setting method, since PDCCH order between a plurality of serving cells is not indicated in an environment in which a plurality of BWPs is set in a single serving sell, implementation in the UE may be further easily performed.

Identifier for DCI Formats—1 bit or 2 bits

If the field is set to 1 bit, each of fallback DCI may have the same number of bits. Thus, a value of 0 indicates DCI format 0_0 and a value of 1 indicates DCI format 1_0 as a field for identifying DCI format 0_0 or DCI format 1_0. In this case, the eNode B may implicitly indicate to the UE regarding whether the corresponding DCI indicates PDCCH order based on settings of some field values included in the DCI.

If the field is set to 2 bits (e.g., if a further larger number of bits are used to explicitly indicate PDCCH order, the indication may be performed as follows:

00: DCI format 0_0
01: DCI format 1_0
10: PDCCH order
11: reserved

Frequency Domain Resource Assignment—$\lceil \log_2(N_{RB}^{UL,BWP}+1)/2 \rceil$ bits To indicate the DCI format for PDCCH order, all of the bits are set to 0 or 1. Although the frequency resource assignment field is not information required to indicate PDCCH order, the DCI format used to transmit the PDCCH order is based on DCI format 0_0/DCI format 1_0. Accordingly, the eNode B may indicate whether the PDCCH order is based on DCI format 0_0/DCI format 1_0 using the aforementioned setting method.

Time Domain Resource Assignment—X bits

To indicate PDCCH order, all of the bits are set to 0 or 1. Alternatively;

The bits are set to indicate one of corresponding specific codepoints using the specific codepoints unused among X bits. The time domain PUSCH resource field indicates a slot offset ($K_2$), a start and length indicator value (SLIV) of a slot, and a combination of PUSCH mapping types (Type A or B) through upper layer configuration. Accordingly, the bits may be set using remaining specific codepoints (i.e., reserved) among X bits as the DCI format indicator for PDCCH order. For example, if X=4 bits, and in this instance, if the bits are set as "1111" or if a single specific value among the following codepoints (reserved) is set, the UE may verify that the received DCI relates to the PDCCH order.

TABLE 5

| Time domain PUSCH resource field | slot offset ($K_2$) | SLIV | PUSCH mapping type |
|---|---|---|---|
| 0 | 1 | 2 | Type A |
| 1 | 2 | 4 | Type A |
| 2 | 3 | 7 | Type B |
| 3 | 4 | 9 | Type B |
| ... | ... | ... | ... |
| $2^x-2$ | reserved | reserved | reserved |
| $2^x-1$ | reserved | reserved | reserved |

PRACH Resource Indicator—K Bits

Within a setting combination of a PRACH configuration period and an SSB-PRACH mapping period given through the field, the eNode B indicates a preamble transmission resource for CFRA using the following indication method:

It is assumed that, if a relationship between an SS/PBCH block index (i.e., SSB) (and/or CSI-RS index) and a PRACH occasion (i.e., ROs in the following cases) index is established, the corresponding UE is applied to (Case 1 in which an upper layer configuration for SSB-PRACH-CFRA-association or CSI-RS-PRACH-CFRA-association is present).

A case in which the relationship is not established (Case 2 in which an upper layer configuration for SSB-PRACH-CFRA-association or CSI-RS-PRACH-CFRA-association is absent) will be further described.

Hereinafter, although description is made based on a relationship between the SSB index based on SSB-PRACH-CFRA association and the PRACH occasion for clarity of description, the proposed method may be applied even to a relationship between the CSI-RS index based on CSI-RS-PRACH-CFRA-association and the PRACH occasion and thereby be used to indicate the corresponding PRACH resource.

The PRACH occasion indicates a minimum time/frequency resource for preamble transmission. Therefore, the preamble transmission may be performed using a maximum of 64 preamble indices based on a PRACH configuration of the eNode B within the corresponding time/frequency resource. An actual location of the time/physical resource for the PRACH occasion may be used to verify a PRACH format through a PRACH configuration indicator (e.g., Table 6) and radio frame(s) and subframe(s) for the preamble transmission. The frequency resource may be determined based on a length of a corresponding PRACH sequence and subcarrier spacing.

TABLE 6

| PRACH Configuration Index | Preamble format | $n_{SFN} \bmod x = y$ | | Subframe number | Starting symbol | Number of PRACH slots within a subframe | Number of time-domain PRACH occasions within a RACH slot |
|---|---|---|---|---|---|---|---|
| | | x | y | | | | |
| 0 | 0 | 2 | 1 | 1 | — | — | — |
| 1 | 0 | 2 | 1 | 4 | — | — | — |
| 2 | 0 | 2 | 1 | 7 | — | — | — |
| 3 | 0 | 1 | 0 | 1 | — | — | — |
| 4 | 0 | 1 | 0 | 4 | — | — | — |
| 5 | 0 | 1 | 0 | 7 | — | — | — |
| 6 | 0 | 1 | 0 | 1, 6 | — | — | — |
| 7 | 0 | 1 | 0 | 2, 7 | — | — | — |
| 8 | 0 | 1 | 0 | 3, 8 | — | — | — |
| 9 | 0 | 1 | 0 | 1, 4, 7 | — | — | — |
| 10 | 0 | 1 | 0 | 2, 5, 8 | — | — | — |
| 11 | 0 | 1 | 0 | 3, 6, 9 | — | — | — |
| 12 | 0 | 1 | 0 | 0, 2, 4, 6, 8 | — | — | — |
| 13 | 0 | 1 | 0 | 1, 3, 5, 7, 9 | — | — | — |
| 14 | 0 | 1 | 0 | 0, 1, 2, 3, 4, 5, 6, 7, 8, 9 | — | — | — |
| 15 | 0 | 2 | 1 | 9 | — | — | — |
| 16 | 0 | 4 | 1 | 1 | — | — | — |
| 17 | 0 | 4 | 1 | 4 | — | — | — |
| 18 | 0 | 4 | 1 | 7 | — | — | — |
| 19 | 0 | 4 | 1 | 9 | — | — | — |
| 20 | 0 | 8 | 1 | 1 | — | — | — |
| 21 | 0 | 8 | 1 | 4 | — | — | — |
| 22 | 0 | 8 | 1 | 7 | — | — | — |
| 23 | 0 | 8 | 1 | 9 | — | — | — |
| 24 | 0 | 16 | 1 | 1 | — | — | — |
| 25 | 0 | 16 | 1 | 4 | — | — | — |
| 26 | 0 | 16 | 1 | 7 | — | — | — |
| 27 | 0 | 16 | 1 | 9 | — | — | — |
| 28 | 1 | 2 | 1 | 1 | — | — | — |
| 29 | 1 | 2 | 1 | 4 | — | — | — |
| 30 | 1 | 2 | 1 | 7 | — | — | — |
| 31 | 1 | 1 | 0 | 1 | — | — | — |
| 32 | 1 | 1 | 0 | 4 | — | — | — |
| 33 | 1 | 1 | 0 | 7 | — | — | — |
| 34 | 1 | 1 | 0 | 1, 6 | — | — | — |
| 35 | 1 | 1 | 0 | 2, 7 | — | — | — |
| 36 | 1 | 1 | 0 | 3, 8 | — | — | — |
| 37 | 1 | 1 | 0 | 1, 4, 7 | — | — | — |
| 38 | 1 | 1 | 0 | 2, 5, 8 | — | — | — |
| 39 | 1 | 1 | 0 | 3, 6, 9 | — | — | — |
| 40 | 1 | 2 | 1 | 9 | — | — | — |
| 41 | 1 | 4 | 1 | 1 | — | — | — |
| 42 | 1 | 4 | 1 | 4 | — | — | — |
| 43 | 1 | 4 | 1 | 7 | — | — | — |
| 44 | 1 | 4 | 1 | 9 | — | — | — |
| 45 | 1 | 8 | 1 | 1 | — | — | — |
| 46 | 1 | 8 | 1 | 4 | — | — | — |
| 47 | 1 | 8 | 1 | 7 | — | — | — |
| 48 | 1 | 8 | 1 | 9 | — | — | — |
| 49 | 1 | 16 | 1 | 1 | — | — | — |
| 50 | 1 | 16 | 1 | 4 | — | — | — |
| 51 | 1 | 16 | 1 | 7 | — | — | — |
| 52 | 1 | 16 | 1 | 9 | — | — | — |
| 53 | 2 | 4 | 0 | 1 | 0 | — | — |
| 54 | 2 | 2 | 0 | 1 | 0 | — | — |

TABLE 6-continued

| PRACH Configuration Index | Preamble format | $n_{SFN} \bmod x = y$ | | Subframe number | Starting symbol | Number of PRACH slots within a subframe | Number of time-domain PRACH occasions within a RACH slot |
|---|---|---|---|---|---|---|---|
| | | x | y | | | | |
| 55 | 2 | 2 | 0 | 5 | 0 | — | — |
| 56 | 2 | 1 | 0 | 1 | 0 | — | — |
| 57 | 2 | 1 | 0 | 5 | 0 | — | — |
| 58 | 2 | 8 | 1 | 1 | 0 | — | — |
| 59 | 2 | 16 | 1 | 1 | 0 | — | — |
| 60 | 3 | 4 | 1 | 1 | — | — | — |
| 61 | 3 | 4 | 1 | 4 | — | — | — |
| 62 | 3 | 4 | 1 | 7 | — | — | — |
| 63 | 3 | 4 | 1 | 9 | — | — | — |
| 64 | 3 | 8 | 1 | 1 | — | — | — |
| 65 | 3 | 8 | 1 | 4 | — | — | — |
| 66 | 3 | 8 | 1 | 7 | — | — | — |
| 67 | 3 | 16 | 1 | 1 | — | — | — |
| 68 | 3 | 16 | 1 | 4 | — | — | — |
| 69 | 3 | 16 | 1 | 7 | — | — | — |
| 70 | 3 | 16 | 1 | 9 | — | — | — |
| 71 | 3 | 2 | 1 | 1 | — | — | — |
| 72 | 3 | 2 | 1 | 4 | — | — | — |
| 73 | 3 | 2 | 1 | 7 | — | — | — |
| 74 | 3 | 1 | 0 | 1 | — | — | — |
| 75 | 3 | 1 | 0 | 4 | — | — | — |
| 76 | 3 | 1 | 0 | 7 | — | — | — |
| 77 | 3 | 1 | 0 | 1, 6 | — | — | — |
| 78 | 3 | 1 | 0 | 2, 7 | — | — | — |
| 79 | 3 | 1 | 0 | 3, 8 | — | — | — |
| 80 | 3 | 1 | 0 | 1, 4, 7 | — | — | — |
| 81 | 3 | 1 | 0 | 2, 5, 8 | — | — | — |
| 82 | 3 | 1 | 0 | 3, 6, 9 | — | — | — |
| 83 | 3 | 1 | 0 | 0, 2, 4, 6, 8 | — | — | — |
| 84 | 3 | 1 | 0 | 1, 3, 5, 7, 9 | — | — | — |
| 85 | 3 | 1 | 0 | 0, 1, 2, 3, 4, 5, 6, 7, 8, 9 | — | — | — |
| 86 | 3 | 2 | 1 | 9 | — | — | — |
| 87 | | | | | | | |
| 88 | | | | | | | |
| 89 | | | | | | | |
| 90 | | | | | | | |
| 91 | | | | | | | |
| 92 | A1 | 16 | 0 | 4, 9 | 0 | 1 | 6 |
| 92 | A1 | 16 | 1 | 4 | 0 | 2 | 6 |
| 93 | A1 | 8 | 0 | 4, 9 | 0 | 1 | 6 |
| 94 | A1 | 8 | 1 | 4 | 0 | 2 | 6 |
| 95 | A1 | 4 | 0 | 4, 9 | 0 | 1 | 6 |
| 96 | A1 | 4 | 0 | 4 | 0 | 2 | 6 |
| 97 | A1 | 4 | 1 | 4, 9 | 0 | 1 | 6 |
| 98 | A1 | 2 | 0 | 4, 9 | 0 | 1 | 6 |
| 99 | A1 | 2 | 0 | 1 | 0 | 2 | 6 |
| 100 | A1 | 2 | 0 | 4 | 0 | 2 | 6 |
| 101 | A1 | 2 | 0 | 7 | 0 | 2 | 6 |
| 102 | A1 | 1 | 0 | 1 | 0 | 2 | 6 |
| 103 | A1 | 1 | 0 | 4 | 0 | 1 | 6 |
| 104 | A1 | 1 | 0 | 7 | 0 | 2 | 6 |
| 105 | A1 | 1 | 0 | 1, 6 | 0 | 1 | 6 |
| 106 | A1 | 1 | 0 | 2, 7 | 0 | 2 | 6 |
| 107 | A1 | 1 | 0 | 4, 9 | 0 | 1 | 6 |
| 108 | A1 | 1 | 0 | 1, 4, 7 | 0 | 2 | 6 |
| 109 | A1 | 1 | 0 | 0, 2, 4, 6, 8 | 0 | 2 | 6 |
| 110 | A1 | 1 | 0 | 0, 1, 2, 3, 4, 5, 6, 7, 8, 9 | 0 | 2 | 6 |
| 111 | A1 | 1 | 0 | 1, 3, 5, 7, 9 | 0 | 2 | 6 |
| 112 | A2 | 16 | 1 | 2, 6, 9 | 0 | 1 | 3 |
| 113 | A2 | 16 | 1 | 4 | 0 | 2 | 3 |
| 114 | A2 | 8 | 1 | 2, 6, 9 | 0 | 1 | 3 |
| 115 | A2 | 8 | 1 | 4 | 0 | 2 | 3 |
| 116 | A2 | 4 | 0 | 2, 6, 9 | 0 | 1 | 3 |
| 117 | A2 | 4 | 0 | 4 | 0 | 2 | 3 |
| 118 | A2 | 2 | 1 | 2, 6, 9 | 0 | 1 | 3 |
| 119 | A2 | 2 | 0 | 1 | 0 | 2 | 3 |
| 120 | A2 | 2 | 0 | 4 | 0 | 2 | 3 |
| 121 | A2 | 2 | 0 | 7 | 0 | 2 | 3 |
| 122 | A2 | 1 | 0 | 1 | 0 | 2 | 3 |
| 123 | A2 | 1 | 0 | 4 | 0 | 1 | 3 |
| 124 | A2 | 1 | 0 | 7 | 0 | 2 | 3 |
| 125 | A2 | 1 | 0 | 1, 6 | 0 | 1 | 3 |

TABLE 6-continued

| PRACH Configuration Index | Preamble format | $n_{SFN} \bmod x = y$ | | Subframe number | Starting symbol | Number of PRACH slots within a subframe | Number of time-domain PRACH occasions within a RACH slot |
| --- | --- | --- | --- | --- | --- | --- | --- |
| | | x | y | | | | |
| 126 | A2 | 1 | 0 | 2, 7 | 0 | 2 | 3 |
| 127 | A2 | 1 | 0 | 4, 9 | 0 | 1 | 3 |
| 128 | A2 | 1 | 0 | 1, 4, 7 | 0 | 2 | 3 |
| 129 | A2 | 1 | 0 | 0, 2, 4, 6, 8 | 0 | 2 | 3 |
| 130 | A2 | 1 | 0 | 0, 1, 2, 3, 4, 5, 6, 7, 8, 9 | 0 | 2 | 3 |
| 131 | A2 | 1 | 0 | 1, 3, 5, 7, 9 | 0 | 2 | 3 |
| 132 | A3 | 16 | 1 | 4, 9 | 0 | 1 | 2 |
| 133 | A3 | 8 | 1 | 4, 9 | 0 | 1 | 2 |
| 134 | A3 | 4 | 0 | 4, 9 | 0 | 1 | 2 |
| 135 | A3 | 16 | 1 | 4 | 0 | 2 | 2 |
| 136 | A3 | 8 | 1 | 4 | 0 | 2 | 2 |
| 137 | A3 | 4 | 0 | 4 | 0 | 2 | 2 |
| 138 | A3 | 2 | 1 | 2, 6, 9 | 0 | 2 | 2 |
| 139 | A3 | 2 | 0 | 1 | 0 | 2 | 2 |
| 140 | A3 | 2 | 0 | 4 | 0 | 2 | 2 |
| 141 | A3 | 2 | 0 | 7 | 0 | 2 | 2 |
| 142 | A3 | 1 | 0 | 1 | 0 | 2 | 2 |
| 143 | A3 | 1 | 0 | 4 | 0 | 1 | 2 |
| 144 | A3 | 1 | 0 | 7 | 0 | 2 | 2 |
| 145 | A3 | 1 | 0 | 1, 6 | 0 | 1 | 2 |
| 146 | A3 | 1 | 0 | 2, 7 | 0 | 2 | 2 |
| 147 | A3 | 1 | 0 | 4, 9 | 0 | 1 | 2 |
| 148 | A3 | 1 | 0 | 1, 4, 7 | 0 | 2 | 2 |
| 149 | A3 | 1 | 0 | 0, 2, 4, 6, 8 | 0 | 2 | 2 |
| 150 | A3 | 1 | 0 | 0, 1, 2, 3, 4, 5, 6, 7, 8, 9 | 0 | 2 | 2 |
| 151 | A3 | 1 | 0 | 1, 3, 5, 7, 9 | 0 | 2 | 2 |
| 152 | B1 | 16 | 0 | 4, 9 | 0 | 1 | 7 |
| 153 | B1 | 16 | 1 | 4 | 0 | 2 | 7 |
| 154 | B1 | 8 | 0 | 4, 9 | 0 | 1 | 7 |
| 155 | B1 | 8 | 1 | 4 | 0 | 2 | 7 |
| 156 | B1 | 4 | 0 | 4, 9 | 0 | 1 | 7 |
| 157 | B1 | 4 | 0 | 4 | 0 | 2 | 7 |
| 158 | B1 | 4 | 1 | 4, 9 | 0 | 1 | 7 |
| 159 | B1 | 2 | 0 | 4, 9 | 0 | 1 | 7 |
| 160 | B1 | 2 | 0 | 1 | 0 | 2 | 7 |
| 161 | B1 | 2 | 0 | 4 | 0 | 2 | 7 |
| 162 | B1 | 2 | 0 | 7 | 0 | 2 | 7 |
| 163 | B1 | 1 | 0 | 1 | 0 | 2 | 7 |
| 164 | B1 | 1 | 0 | 4 | 0 | 1 | 7 |
| 165 | B1 | 1 | 0 | 7 | 0 | 2 | 7 |
| 166 | B1 | 1 | 0 | 1, 6 | 0 | 1 | 7 |
| 167 | B1 | 1 | 0 | 2, 7 | 0 | 2 | 7 |
| 168 | B1 | 1 | 0 | 4, 9 | 0 | 1 | 7 |
| 169 | B1 | 1 | 0 | 1, 4, 7 | 0 | 2 | 7 |
| 170 | B1 | 1 | 0 | 0, 2, 4, 6, 8 | 0 | 2 | 7 |
| 171 | B1 | 1 | 0 | 0, 1, 2, 3, 4, 5, 6, 7, 8, 9 | 0 | 2 | 7 |
| 172 | B1 | 1 | 0 | 1, 3, 5, 7, 9 | 0 | 2 | 7 |
| 173 | B4 | 16 | 0 | 4, 9 | 0 | 2 | 1 |
| 174 | B4 | 16 | 1 | 4 | 0 | 2 | 1 |
| 175 | B4 | 8 | 0 | 4, 9 | 0 | 2 | 1 |
| 176 | B4 | 8 | 1 | 4 | 0 | 2 | 1 |
| 177 | B4 | 4 | 0 | 4, 9 | 0 | 2 | 1 |
| 178 | B4 | 4 | 0 | 4 | 0 | 2 | 1 |
| 179 | B4 | 4 | 1 | 4, 9 | 0 | 2 | 1 |
| 180 | B4 | 2 | 0 | 4, 9 | 0 | 2 | 1 |
| 181 | B4 | 2 | 0 | 1 | 0 | 2 | 1 |
| 182 | B4 | 2 | 0 | 4 | 0 | 2 | 1 |
| 183 | B4 | 2 | 0 | 7 | 0 | 2 | 1 |
| 184 | B4 | 1 | 0 | 1 | 0 | 2 | 1 |
| 185 | B4 | 1 | 0 | 4 | 0 | 2 | 1 |
| 186 | B4 | 1 | 0 | 7 | 0 | 2 | 1 |
| 187 | B4 | 1 | 0 | 1, 6 | 0 | 2 | 1 |
| 188 | B4 | 1 | 0 | 2, 7 | 0 | 2 | 1 |
| 189 | B4 | 1 | 0 | 4, 9 | 0 | 2 | 1 |
| 190 | B4 | 1 | 0 | 1, 4, 7 | 0 | 2 | 1 |
| 191 | B4 | 1 | 0 | 0, 2, 4, 6, 8 | 0 | 2 | 1 |
| 192 | B4 | 1 | 0 | 0, 1, 2, 3, 4, 5, 6, 7, 8, 9 | 0 | 2 | 1 |
| 193 | B4 | 1 | 0 | 1, 3, 5, 7, 9 | 0 | 2 | 1 |
| 194 | C0 | 8 | 1 | 4 | 0 | 2 | 7 |
| 195 | C0 | 4 | 0 | 4 | 0 | 2 | 7 |

TABLE 6-continued

| PRACH Configuration Index | Preamble format | $n_{SFN}\ \text{mod}\ x = y$ | | Subframe number | Starting symbol | Number of PRACH slots within a subframe | Number of time-domain PRACH occasions within a RACH slot |
|---|---|---|---|---|---|---|---|
| | | x | y | | | | |
| 196 | C0 | 4 | 1 | 4, 9 | 0 | 1 | 7 |
| 197 | C0 | 2 | 0 | 4, 9 | 0 | 1 | 7 |
| 198 | C0 | 2 | 0 | 1 | 0 | 2 | 7 |
| 199 | C0 | 2 | 0 | 4 | 0 | 2 | 7 |
| 200 | C0 | 2 | 0 | 7 | 0 | 2 | 7 |
| 201 | C0 | 1 | 0 | 1 | 0 | 2 | 7 |
| 202 | C0 | 1 | 0 | 4 | 0 | 1 | 7 |
| 203 | C0 | 1 | 0 | 7 | 0 | 2 | 7 |
| 204 | C0 | 1 | 0 | 1, 6 | 0 | 1 | 7 |
| 205 | C0 | 1 | 0 | 2, 7 | 0 | 2 | 7 |
| 206 | C0 | 1 | 0 | 4, 9 | 0 | 1 | 7 |
| 207 | C0 | 1 | 0 | 1, 4, 7 | 0 | 2 | 7 |
| 208 | C0 | 1 | 0 | 0, 2, 4, 6, 8 | 0 | 2 | 7 |
| 209 | C0 | 1 | 0 | 0, 1, 2, 3, 4, 5, 6, 7, 8, 9 | 0 | 2 | 7 |
| 210 | C0 | 1 | 0 | 1, 3, 5, 7, 9 | 0 | 2 | 7 |
| 211 | C2 | 16 | 1 | 4, 9 | 0 | 1 | 2 |
| 212 | C2 | 8 | 1 | 4, 9 | 0 | 1 | 2 |
| 213 | C2 | 4 | 0 | 4, 9 | 0 | 1 | 2 |
| 214 | C2 | 16 | 1 | 4 | 0 | 2 | 2 |
| 215 | C2 | 8 | 1 | 4 | 0 | 2 | 2 |
| 216 | C2 | 4 | 0 | 4 | 0 | 2 | 2 |
| 217 | C2 | 2 | 1 | 2, 6, 9 | 0 | 2 | 2 |
| 218 | C2 | 2 | 0 | 1 | 0 | 2 | 2 |
| 219 | C2 | 2 | 0 | 4 | 0 | 2 | 2 |
| 220 | C2 | 2 | 0 | 7 | 0 | 2 | 2 |
| 221 | C2 | 1 | 0 | 1 | 0 | 2 | 2 |
| 222 | C2 | 1 | 0 | 4 | 0 | 1 | 2 |
| 223 | C2 | 1 | 0 | 7 | 0 | 2 | 2 |
| 224 | C2 | 1 | 0 | 1, 6 | 0 | 1 | 2 |
| 225 | C2 | 1 | 0 | 2, 7 | 0 | 2 | 2 |
| 226 | C2 | 1 | 0 | 4, 9 | 0 | 1 | 2 |
| 227 | C2 | 1 | 0 | 1, 4, 7 | 0 | 2 | 2 |
| 228 | C2 | 1 | 0 | 0, 2, 4, 6, 8 | 0 | 2 | 2 |
| 229 | C2 | 1 | 0 | 0, 1, 2, 3, 4, 5, 6, 7, 8, 9 | 0 | 2 | 2 |
| 230 | C2 | 1 | 0 | 1, 3, 5, 7, 9 | 0 | 2 | 2 |
| 231 | A1/B1 | 2 | 0 | 4, 9 | 0 | 1 | 7 |
| 232 | A1/B1 | 2 | 0 | 4 | 0 | 2 | 7 |
| 233 | A1/B1 | 1 | 0 | 1 | 0 | 2 | 7 |
| 234 | A1/B1 | 1 | 0 | 4 | 0 | 1 | 7 |
| 235 | A1/B1 | 1 | 0 | 7 | 0 | 2 | 7 |
| 236 | A1/B1 | 1 | 0 | 1, 6 | 0 | 1 | 7 |
| 237 | A1/B1 | 1 | 0 | 4, 9 | 0 | 1 | 7 |
| 238 | A1/B1 | 1 | 0 | 1, 4, 7 | 0 | 2 | 7 |
| 239 | A1/B1 | 1 | 0 | 0, 2, 4, 6, 8 | 0 | 2 | 7 |
| 240 | A1/B1 | 1 | 0 | 0, 1, 2, 3, 4, 5, 6, 7, 8, 9 | 0 | 2 | 7 |
| 241 | A2/B2 | 2 | 1 | 2, 6, 9 | 0 | 1 | 3 |
| 242 | A2/B2 | 2 | 0 | 4 | 0 | 2 | 3 |
| 243 | A2/B2 | 1 | 0 | 1 | 0 | 2 | 3 |
| 244 | A2/B2 | 1 | 0 | 4 | 0 | 1 | 3 |
| 245 | A2/B2 | 1 | 0 | 7 | 0 | 2 | 3 |
| 246 | A2/B2 | 1 | 0 | 1, 6 | 0 | 1 | 3 |
| 247 | A2/B2 | 1 | 0 | 4, 9 | 0 | 1 | 3 |
| 248 | A2/B2 | 1 | 0 | 1, 4, 7 | 0 | 2 | 3 |
| 249 | A2/B2 | 1 | 0 | 0, 2, 4, 6, 8 | 0 | 2 | 3 |
| 250 | A2/B2 | 1 | 0 | 0, 1, 2, 3, 4, 5, 6, 7, 8, 9 | 0 | 2 | 3 |
| 251 | A3/B3 | 2 | 1 | 2, 6, 9 | 0 | 2 | 2 |
| 252 | A3/B3 | 2 | 0 | 4 | 0 | 2 | 2 |
| 253 | A3/B3 | 1 | 0 | 1 | 0 | 2 | 2 |
| 254 | A3/B3 | 1 | 0 | 4 | 0 | 1 | 2 |
| 255 | A3/B3 | 1 | 0 | 7 | 0 | 2 | 2 |
| 256 | A3/B3 | 1 | 0 | 1, 6 | 0 | 1 | 2 |
| 257 | A3/B3 | 1 | 0 | 4, 9 | 0 | 1 | 2 |
| 258 | A3/B3 | 1 | 0 | 1, 4, 7 | 0 | 2 | 2 |
| 259 | A3/B3 | 1 | 0 | 0, 2, 4, 6, 8 | 0 | 2 | 2 |
| 260 | A3/B3 | 1 | 0 | 0, 1, 2, 3, 4, 5, 6, 7, 8, 9 | 0 | 2 | 2 |

Embodiment 2

Embodiment 2 relates to a method of indicating a PRACH resource index.

Figure 4:
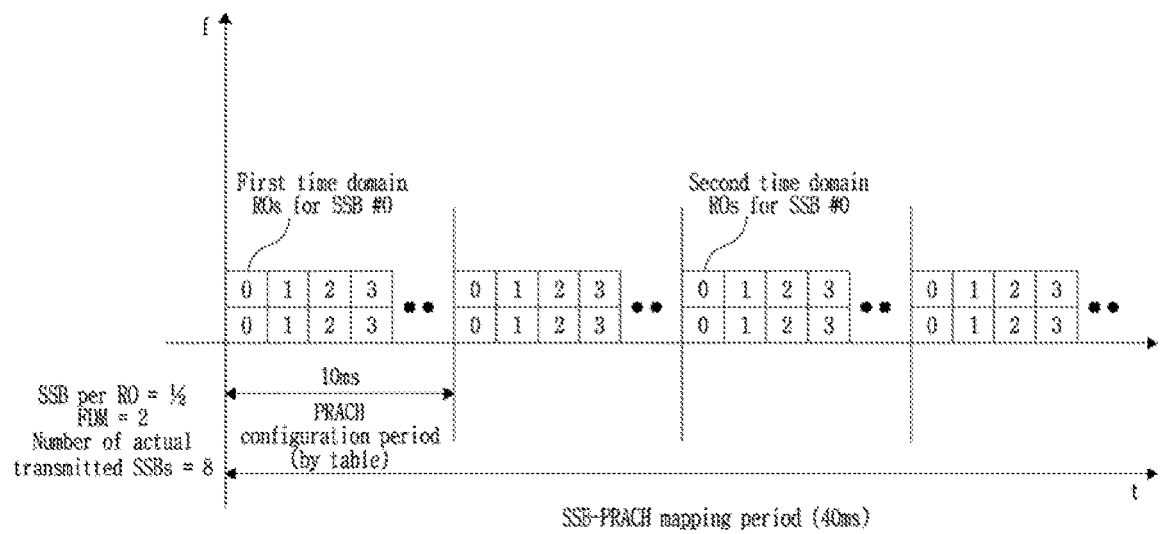
FIG. 4 illustrates an example of a method of indicating a PRACH resource (also referred to as a PRACH resource indication method) in a sync signal block (SSB)-PRACH occasion mapping period.

FIG. 4 illustrates an example of a method of indicating a PRACH resource (hereinafter, also referred to as a PRACH resource indication method) in an SSB-PRACH mapping period according to an example embodiment.

Referring to FIG. 4, an eNode B and a UE recognize in advance a relationship between an SS/PBCH block index (CSI-RS index based on a CSI-RS-PRACH-CFRA-association configuration) and a PRACH occasion, based on an upper layer configuration for SSB-PRACH-CFRA-association. The above example assumes the following settings.

PRACH configuration period: is set to 10 ms. It is possible to indicate to the UE that the PRACH occasion (time resource) is set per specific time (e.g., every 10/20/40/80 or 160 ms) based on the corresponding PRACH configuration period.

The corresponding value range may include one of {10, 20, 40, 80, 160 ms}.

A single value is set based on a PRACH configuration index value by referring to, for example, Table 3.

Actual transmitted SSB (or CSI-RS)-PRACH mapping configuration period: is set to 40 ms. The corresponding parameter may be set to the UE by the eNode B based on an upper layer parameter for a period in which a relationship between the actual transmitted SSB (or CSI-RS) index and the PRACH occasion is repeatedly applied, or may be predetermined using a single random value. In the above example, the corresponding period is set to 40 ms and the actual transmitted SSB (or CSI-RS) index and RACH occasions set within 40 ms may be cyclically mapped to each other within the corresponding time domain. Referring to FIG. 4 (e.g., first and second ROs for SSB index #0);

a single box: represents a single RO in FIG. 4;

SSB per RO: a number of SSBs per PRACH occasion =½

Configuration information regarding a number of SSBs capable of being associated with a single RO The corresponding value range may include one of {⅛, ¼, ½, 1, 2, 4, 8, 16}.

FDM: sets PRACH-FDM, presence or absence of an FDM-based RO in a time in which a RO for preamble transmission is present, and a number of ROs for FDM. In the above example, it is set as 2.

The corresponding value range may include one of {1, 2, 4, 8}.

A number of actual transmitted SSBs: is set to 8. Actual SSB transmission corresponding to a maximum number L of transmittable SSBs or less may be performed based on upper layer configuration of the eNode B within the maximum number L of transmittable SSBs. The number of actual transmitted SSBs may be provided through system information or through dedicated RRC signaling to UEs present in a cell in which the eNode B operates in such a manner that the eNode B selects a random value based on a physical location of the cell, beam coverage corresponding thereto, eNode B antenna capability (e.g., the number of antennas and antenna configuration (e.g., analogue beam forming or digital/hybrid beam forming)), and the like.

PRACH resource indicator (K bits) may include an SSB (or CSI-RS) index and/or RO occasion chances. Through the above configuration method, it is possible to provide the UE with a further flexible preamble transmission resource by indicating a portion of or all of ROs (e.g., first RO and second RO of FIG. 4) capable of being present in a plurality of time domains associated with a single SSB (or CSI-RS) index within a SSB-PRACH mapping period (e.g., 40 ms) as shown in the example of FIG. 4. For example, the eNode B may indicate to the UE that the PRACH resource indicator indicates the SSB (or CSI-RS) index and additionally indicates a specific RO allowing a CFRA-based preamble transmission among a plurality of ROs associated with the SSB (or CSI-RS) index.

For example, Table 7 may be provided for the above embodiment. That is, the SSB (or CSI-RS) index and ROs associated therewith may be indicated using a single PRACH resource index. Also, the SSB index and the RO index associated therewith may be separately indicated.

TABLE 7

| PRACH resource index (K bits) | SSB (or CSI-RS) index | Allowed PRACH ROs associated SSB (or CSI-RS) index |
|---|---|---|
| 0 | 0 | Any |
| 1 | 1 | Any |
| 2 | 2 | Any |
| 3 | 3 | Any |
| . . . | . . . | Any |
| 8 | 0 | Even time domain ROs associated with SSB (or CSI-RS) #0 within SSB-PRACH mapping configuration period |
| 9 | 0 | Odd time domain ROs associated with SSB (or CSI-RS) #0 within SSB-PRACH mapping configuration period |
| 10 | 1 | Even time domain ROs associated with SSB(or CSI-RS) #0 within SSB-PRACH mapping configuration period |
| 11 | 1 | Odd time domain ROs associated with SSB (or CSI-RS) #0 within SSB-PRACH mapping configuration period |
| . . . | . . . | . . . |

Referring to the embodiment of Table 7, the eNode B may combine specific RO indices and SSB (or CSI-RS) index within the SSB-PRACH mapping configuration period and may indicate CFRA transmission to the UE through PDCCH order. Therefore, the eNode B may indicate to the UE the CFRA preamble transmission in all of or a portion of ROs associated with a corresponding SSB index using RO index or specific RO index numbers, such as first/second, as well as even or odd time domain ROs within Table 7.

TABLE 8

| PRACH resource index (K bits) | SSB (or CSI-RS) index | Allowed PRACH ROs associated SSB (or CSI-RS) index |
|---|---|---|
| 0 | 0 | Any |
| 1 | 1 | Any |
| 2 | 2 | Any |
| 3 | 3 | Any |
| . . . | . . . | Any |
| 8 | 0 | Even time/Evenfreq. domain ROs associated with SSB (or CSI-RS) #0 within SSB-PRACH mapping configuration period |
| 9 | 0 | Odd time/Oddfreq. domain ROs associated with SSB (or CSI-RS) #0 within SSB-PRACH mapping configuration period |

TABLE 8-continued

| PRACH resource index (K bits) | SSB (or CSI-RS) index | Allowed PRACH ROs associated SSB (or CSI-RS) index |
|---|---|---|
| 10 | 1 | Even time/Evenfreq. domain ROs associated with SSB (or CSI-RS) #0 within SSB-PRACH mapping configuration period |
| 11 | 1 | Odd time/Odd freq. domain ROs associated with SSB (or CSI-RS) #0 within SSB-PRACH mapping configuration period |
| ... | ... | ... |

Here, although FIG. 4 illustrates that a CFRA preamble transmission resource is selectively indicated in a time domain, it can be verified that a plurality of ROs is associated with a single SSB in a frequency domain. In this case, a CFRA preamble index set per SSB index may be used to perform a corresponding preamble transmission in each of FDMed ROs. That is, in the embodiment of FIG. 4, an SSB index and a time domain RO are indicated through a PRACH resource index within a DCI format. Here, the eNode B additionally indicates a preamble index value to the UE through a preamble index field. The eNode B may indicate a CFRA preamble transmission resource in a different time domain based on such indication information, however, may not indicate an additional CFRA preamble transmission in a frequency domain. Accordingly, when a plurality of ROs associated with the same SSB is present in the frequency domain as described above (e.g., SSB per RO<1), the preamble transmission needs to be performed in the plurality of ROs. Therefore, the UE may unnecessarily perform a plurality of preamble transmissions, which may cause interference. Accordingly, the following proposed additional embodiment relates to signaling for PDCCH order by additionally indicating a RO resource in a frequency domain in a DCI format.

Figure 5:
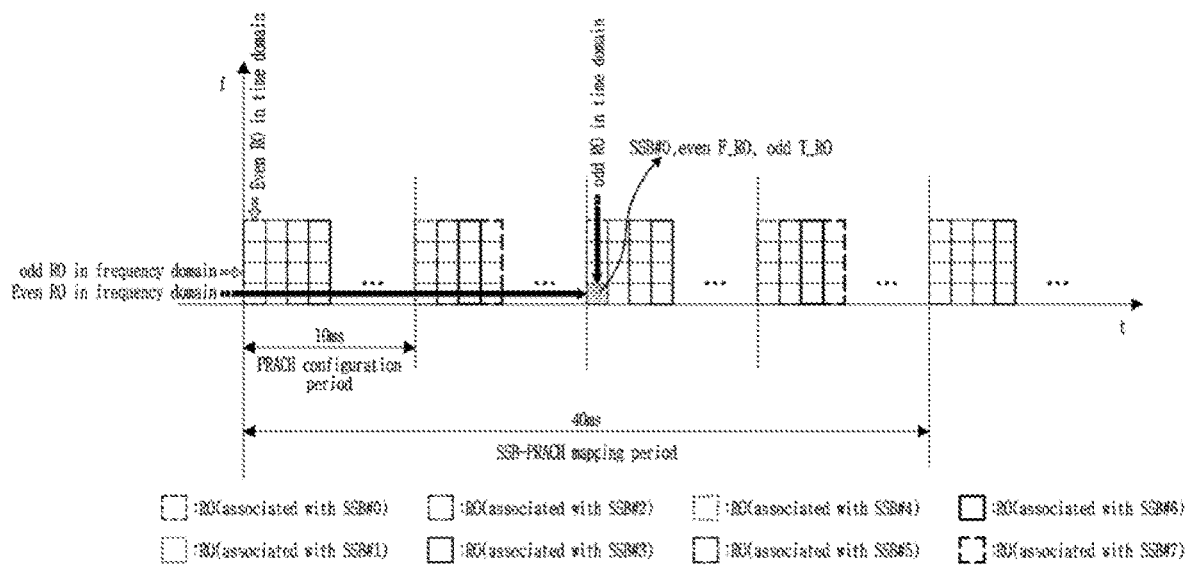
FIG. 5 illustrates an example of a PRACH resource indication method in an SSB-PRACH mapping period.

FIG. 5 illustrates another example of a PRACH resource indication method in an SSB-PRACH mapping period according to an example embodiment. Here, the example of FIG. 5 may be set as follow:
  PRACH configuration period: is set to 10 ms.
  Actual transmitted SSB (or CSI-RS)-PRACH mapping configuration period: 40 ms
  SSB per RO: a number of SSBs per PRACH occasion=¼
  PRACH-FDM=4

Referring to FIG. 5, a CFRA preamble transmission in a specific RO within a single SSB-PRACH mapping period is indicated based on information of SSB index=0 (or CSI-RS index), frequency domain RO index=even, and time index RO index=odd.

Figure 6:
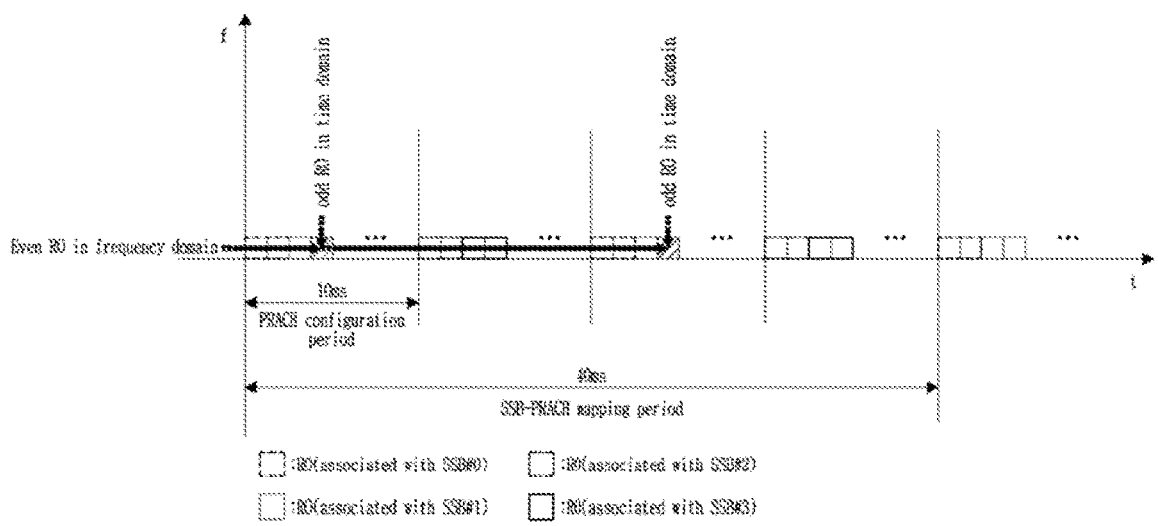
FIG. 6 illustrates an example of a PRACH resource indication method in an SSB-PRACH mapping period.

FIG. 6 illustrates another example of a PRACH resource indication method in an SSB-PRACH mapping period according to an example embodiment. Here, the example of FIG. 6 may be set as follows:
  PRACH configuration period: is set to 10 ms.
  Actual transmitted SSB (or CSI-RS)-PRACH mapping configuration period: 40 ms
  SSB per RO: a number of SSBs per PRACH occasion=½
  PRACH-FDM=1
  Number of transmitted SSBs: is set to 4.

Referring to FIG. 6, a CFRA preamble transmission in a specific RO within a single SSB-PRACH mapping period is indicated based on information of SSB index=1 (or CSI-RS index), frequency domain RO index=even, and time index RO index=odd.

Figure 7:
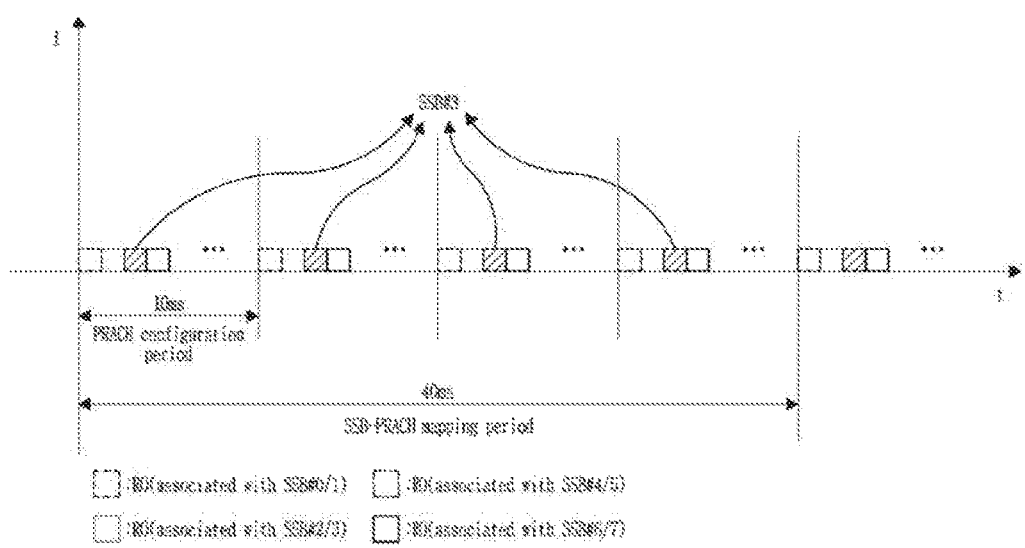
FIG. 7 illustrates an example of a PRACH resource indication method in an SSB-PRACH mapping period.

FIG. 7 illustrates another example of a PRACH resource indication method in an SSB-PRACH mapping period according to an example embodiment. Here, the example of FIG. 7 may be set as follows:
  PRACH configuration period: is set to 10 ms.
  Actual transmitted SSB (or CSI-RS)-PRACH mapping configuration period: 40 ms
  SSB per RO: number of SSBs per PRACH occasion=2
  PRACH-FDM=1
  Number of transmitted SSBs: is set to 4.

Referring to FIG. 7, a CFRA preamble transmission in a specific RO within a single SSB-PRACH mapping period is indicated based on information of SSB index=3 (or CSI-RS index) only. Therefore, if upper layer parameter SSB per RO: number of SSBs per PRACH occasion ≥1 (i.e., SSB per RO=1, 2, 4, 8 or 16), only an SSB index is indicated through a DCI format as shown in FIG. 7. Otherwise (i.e., SSB per RO=⅛, ¼ or ½), the CFRA preamble transmission in the specific RO is indicated through the SSB index, time/frequency domain RO index proposed in FIGS. 4 to 6.

A PRACH resource index indicates an "SSB index" and a "RO index" and thereby indicates the CFRA preamble transmission only in a specific RO within the SSB-PRACH mapping period. Here, a number of bits for the SSB index may be determined based on the number of actual transmitted SSBs and a number of bits for the RO index may be determined based on a PRACH-FDM value.

For example, the eNode B and the UE may assume the same case in which, if the number of actual transmitted SSB=12 through upper layer configuration, the SSB index of 4 bits may be transmitted and if the PRACH-FDM=8, the RO index of 3 bits may be transmitted within the DCI format.

Figure 8:
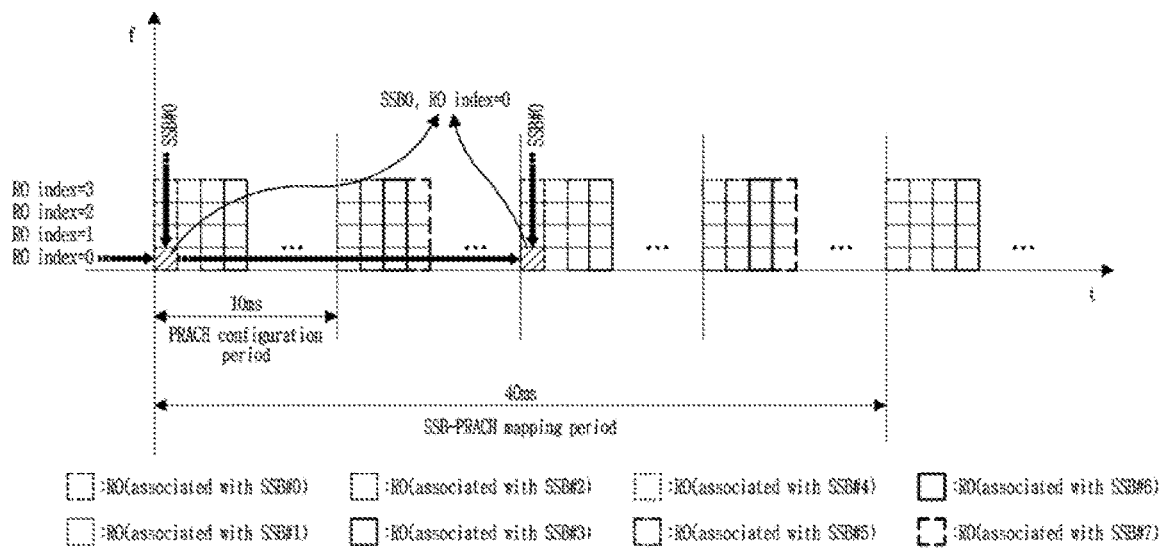
FIG. 8 illustrates an example of a PRACH resource indication method in an SSB-PRACH mapping period.

FIG. 8 illustrates another example of a PRACH resource indication method in an SSB-PRACH mapping period according to an example embodiment. Here, the example of FIG. 8 may be set as follows:
  PRACH configuration period: is set to 10 ms.
  Actual transmitted SSB(or CSI-RS)-PRACH mapping configuration period: 40 ms
  SSB per RO: a number of SSBs per PRACH occasion=½
  PRACH-FDM=2
  Number of transmitted SSBs: is set to 8.

As a feature of the method of FIG. 8, RO indexing may be performed per section in which all of indices of actual transmitted SSBs are indexed with a RO at least once.

The "PRACH resource index indicates the RO index" and thereby indicates the CFRA preamble transmission only in the specific RO within the SSB-PRACH mapping period.

Figure 9:
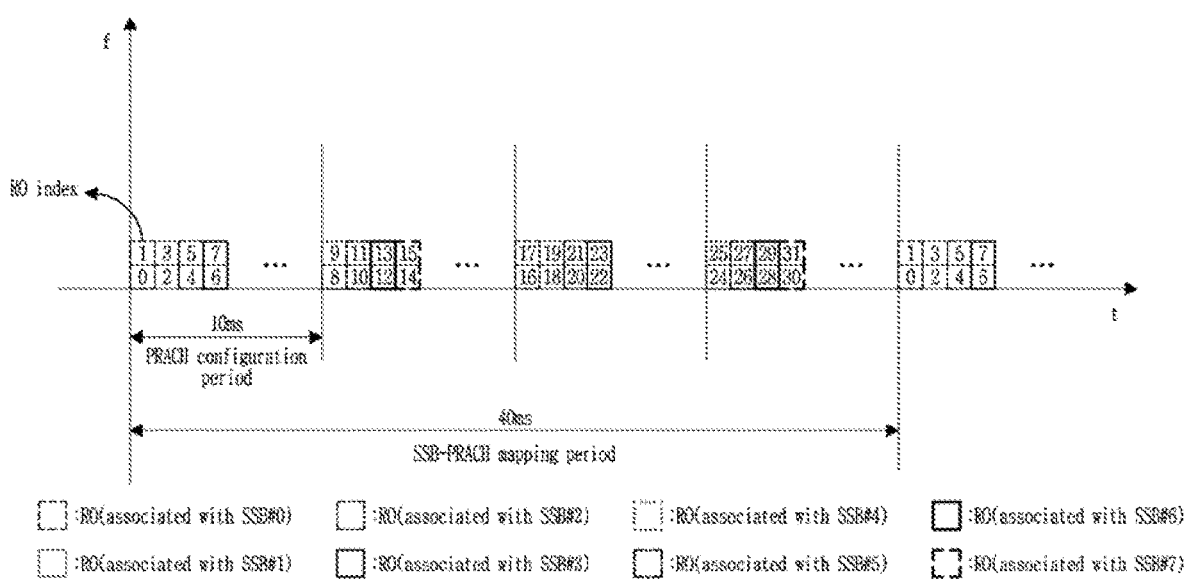
FIG. 9 illustrates an example of a PRACH resource indication method in an SSB-PRACH mapping period.

FIG. 9 illustrates another example of a PRACH resource indication method in an SSB-PRACH mapping period according to an example embodiment. Here, the example of FIG. 9 may be set as follows:
  PRACH configuration period: is set to 10 ms.
  Actual transmitted SSB (or CSI-RS)-PRACH mapping configuration period: 40 ms
  SSB per RO: a number of SSBs per PRACH occasion=½
  PRACH-FDM=2
  Number of transmitted SSBs: is set to 8.

As a feature of the method of FIG. 9, RO indexing may be performed per section in which all of indices of actual transmitted SSBs are indexed with a RO at least once.

In the proposed embodiments, a plurality of pieces of indicator information, for example, all of an SSB index, a RO index, a specific time information index, and the like, indicating a CFRA preamble transmission resource may be joint coded as a single indicator and may be present within a DCI format as an independent control information field. Also, as described above, a number of bits of corresponding fields may vary based on an upper layer configuration.

Figure 10:
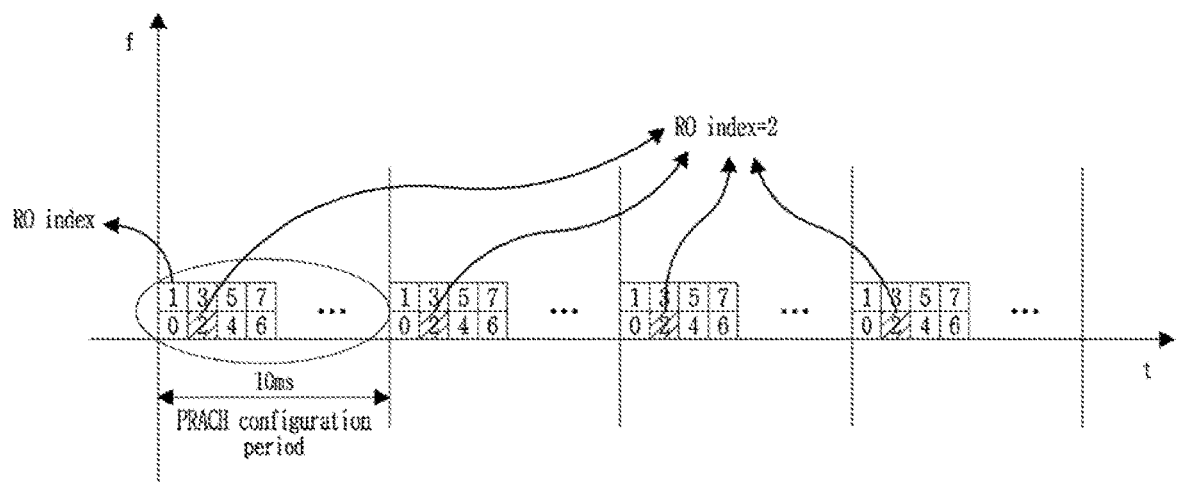
FIG. 10 illustrates an example of a PRACH resource indication method.

FIG. 10 illustrates an example of a PRACH resource indication method according to an example embodiment.

In the proposed embodiments, a plurality of pieces of indicator information, for example, all of an SSB index, a RO index, a specific time information index, and the like, indicating a CFRA preamble transmission resource may be joint coded as a single indicator and may be present within a DCI format as an independent control information field. Also, as described above, a number of bits of corresponding fields may vary based on an upper layer configuration.

As another embodiment, referring to FIG. 10, the corresponding UE may consider a case in which a relationship between an SS/PBCH block index (i.e., SSB) (and/or CSI-RS index) and a PRACH occasion (i.e., ROs in following Figure) index is not established (i.e., a case in which an upper layer configuration for SSB-PRACH-CFRA-association or CSI-RS-PRACH-CFRA-association is absent). Here, since the configuration for the SSB-PRACH association is absent, information on at least the SSB index is not valid. Accordingly, the specific RO may be indicated using a RO index value only.

Embodiment 3

Embodiment 3 may consider a case in which a plurality of CFRA preamble transmissions is set.

Figure 11:
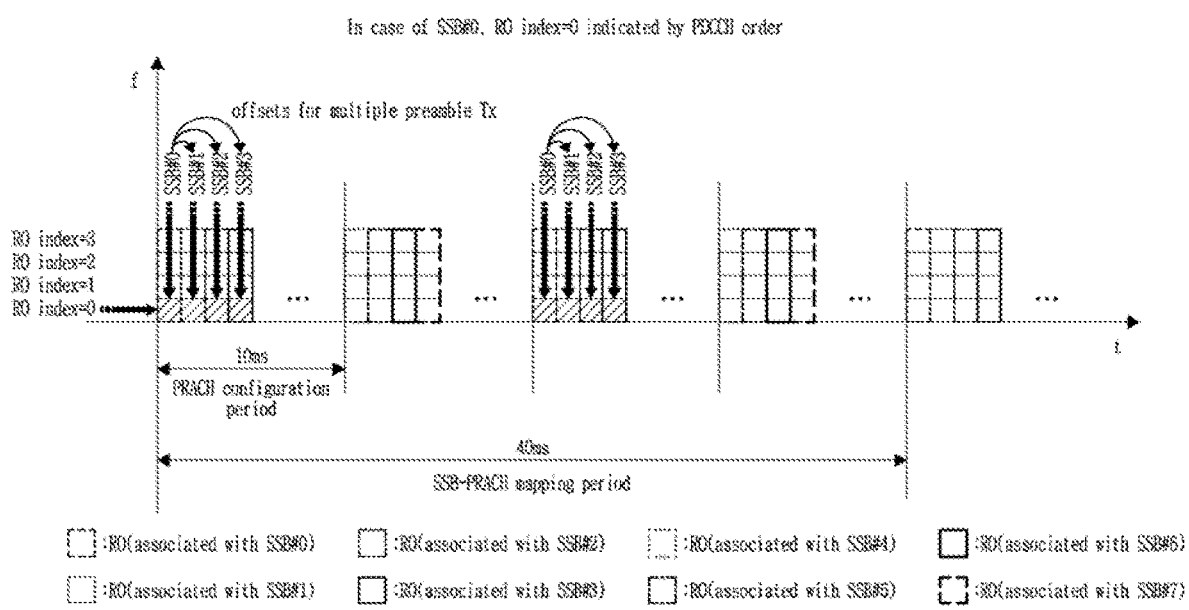
FIG. 11 illustrates an example of a PRACH resource indication method for a user equipment (UE) to which four preamble transmissions are set.
Figure 12:
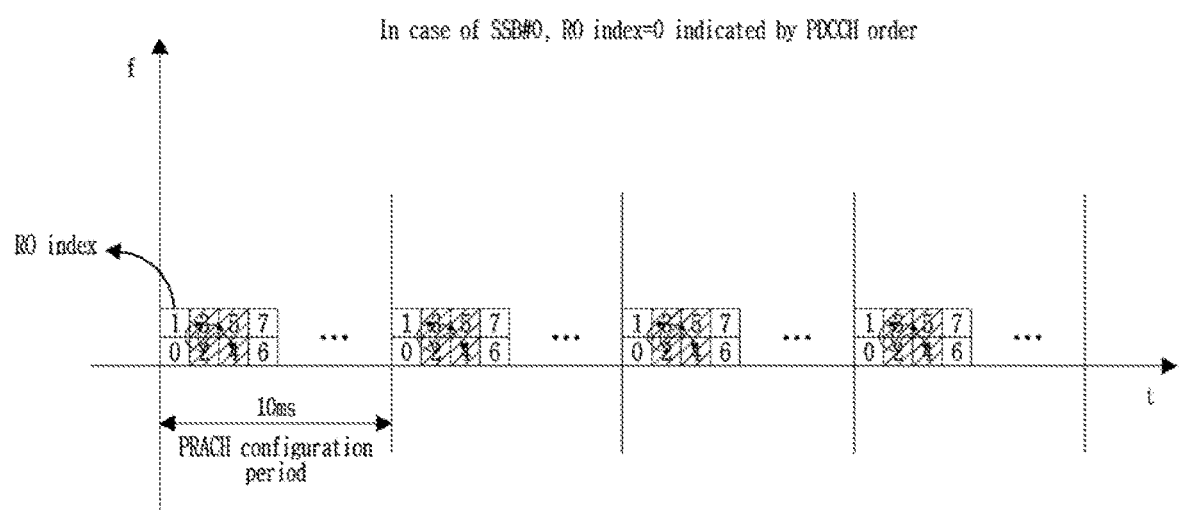
FIG. 12 illustrates an example of a PRACH resource indication method for a UE to which four preamble transmissions are set.

Here, FIGS. 11 and 12 illustrate examples of a PRACH resource indication method for a UE to which four preamble transmissions are set according to an embodiment.

Offset values implicitly determined in SSB index and/or RO index information, which is considered in the methods discussed above as the PRACH resource indication method for the plurality of CFRA preamble transmissions, are assumed as a resource for additional preamble transmission. That is, when the plurality of CFRA preamble transmissions is set to the UE, the eNode B may perform a resource indication for a first preamble transmission based on an SSB index and/or RO index value indicated through the proposed method and may add offset values of the SSB index and/or RO index for the first preamble transmission and thereby indicate a corresponding resource from a resource for a second preamble transmission.

For example, referring to FIG. 11, when four CFRA preamble transmissions are set to a single UE before a single RAR window is terminated and SSB-PRACH-CFRA-association or CSI-RS-PRACH-CFRA-association is set to the UE, predetermined values may be used as additional offset values to the indicated SSB index (or CSI-RS index) value through the proposed methods.

1st preamble transmission: indicated SSB index (or CSI-RS index),
2nd preamble transmission: indicated SSB index (or CSI-RS index)+1,
3rd preamble transmission: indicated SSB index (or CSI-RS index)+2,
4th preamble transmission: indicated SSB index (or CSI-RS index)+3

Accordingly, the CFRA preamble transmissions may be performed on ROs respectively associated with the four indicated SSB index, SSB index+1, SSB index+2, and SSB index+3 based on the s indicated SSB index, SSB index+1, SSB index+2, and SSB index+3. Through the above indication method, the four preamble transmissions enable different uplink beam transmissions, which assists the eNode B to receive a preamble of the corresponding UE.

Accordingly, referring to FIG. 12, additional offset values may be considered for the plurality of preamble transmissions based on the resource indication method proposed in embodiment 3. Alternatively, the additional offset values may be considered for the plurality of preamble transmissions based on a preamble index indicated by a preamble index field.

1st preamble transmission: indicated RO index,
2nd preamble transmission: indicated RO index +1,
3rd preamble transmission: indicated RO index +2,
4th preamble transmission: indicated RO index +3 or
1st preamble transmission: indicated Preamble index,
2nd preamble transmission: indicated Preamble index +1,
3rd preamble transmission: indicated Preamble index +2,
4th preamble transmission: indicated Preamble index +3

Offset values considered in the proposed method may be predetermined as in the above example. Alternatively, the offset values may be set through an upper layer configuration. Accordingly, when the upper layer configuration is present, a resource for a corresponding preamble transmission may be indicated based on the offset values indicated in the upper layer from a transmission resource for the second preamble transmission.

As another method, the offset values may be applied based on a RO index instead of using an SSB index.

Preamble Index—6 Bits

Present within a DCI format for PDCCH order for the eNode B to indicate a total of 64 available preamble indices to the UE.

BWP Indicator—1 or 2 Bits indicates a BWP for CFRA preamble transmission as a bandwidth part indicator and indicates a BWP used for a corresponding CFRA preamble transmission among BWPs set through an upper layer.

UL/SUL Indicator—1 Bit indicates whether to perform a CFRA preamble transmission in a normal UL carrier or a supplement UL (SUL) carrier through a corresponding field when the SUL carrier is set to the UE.

A wireless device may receive, from a base station, one or more messages comprising downlink control information (DCI) associated with a DCI format. The wireless device may determine that a first field of the DCI corresponds to a predefined value, determine that, based on the first field corresponding to the predefined value, the DCI is for a random access procedure associated with a physical downlink control channel (PDCCH) order, and determine, based on the determining that the DCI is for a random access procedure associated with a PDCCH order and based on a plurality of fields of the DCI, a random access channel (RACH) occasion. The wireless device may transmit, based on the RACH occasion, a random access preamble. The plurality of fields of the DCI may comprise an SS/PBCH block index field having a value indicating the SS/PBCH block and an index field having a value indicating one or more RACH occasions. The wireless device may receive information associated with a location of one or more SS/PBCH blocks. The wireless device may determine, from an SS/PBCH block indicated by the value of the SS/PBCH block index field, the RACH occasion. The first field may correspond to a frequency domain resource assignment field. The DCI format may be DCI format 1_0 associated with a physical downlink shared channel (PDSCH) scheduling. The wireless device may determine the DCI based on Cell Radio Network Temporary Identifier (C-RNTI). The DCI may comprise one or more of an identifier for the DCI format, a random access preamble index, or an uplink/supplemental uplink (UL/SUL) indicator.

A wireless device may receive, from a base station, one or more messages comprising downlink control information (DCI). The wireless device may determine that the DCI corresponds to DCI format 1_0, determine that, based on a first field of the DCI format 1_0, the DCI is for a random access procedure associated with a physical downlink control channel (PDCCH) order, and determine, based on a synchronization signal/physical broadcast channel (SS/PBCH) block index field of the DCI and based on an index field associated with one or more random access channel (RACH) occasions, a RACH occasion. The wireless device may transmit, based on the RACH occasion, a random access preamble. The wireless device may receive information associated with a location of one or more SS/PBCH blocks. The wireless device may determine, from an SS/PBCH block indicated by a value of the SS/PBCH block index field, the RACH occasion. The first field may correspond to a frequency domain resource assignment field. The DCI may comprise one or more of an identifier for the DCI format, a random access preamble index, or an uplink/supplemental uplink (UL/SUL) indicator. The wireless device may determine the DCI based on Cell Radio Network Temporary Identifier (C-RNTI). The wireless device may receive second DCI corresponding to the DCI format 1_0. The wireless device may determine that a frequency domain resource assignment field has a value different from a predefined value, which is associated with the random access procedure. The wireless device may retrieve, from the second DCI, information of a physical downlink shared channel (PDSCH) scheduling.

A base station may determine a random access channel (RACH) occasion for a wireless device. The RACH occasion may be associated with a synchronization signal/physical broadcast channel (SS/PBCH) block. The base station may generate downlink control information (DCI) corresponding to a DCI format. The DCI may comprise: a first field having a predefined value indicating that the DCI is for a random access procedure associated with a physical downlink control channel (PDCCH) order; an SS/PBCH block index field having a value indicating the SS/PBCH block; and an index field having a value indicating one or more RACH occasions. The RACH occasion for the wireless device may be indicated by the values of the SS/PBCH block index field and the index field. The base station may transmit, to the wireless device, the DCI; and may receive, from the wireless device and based on the RACH occasion, a random access preamble. The base station may transmit information associated with a location of one or more SS/PBCH blocks. The base station may scramble the DCI based on Cell Radio Network Temporary Identifier (C-RNTI). The DCI may comprise one or more of an identifier for the DCI format, a random access preamble index, or an uplink/supplemental uplink (UL/SUL) indicator. The RACH occasion may be within an SS/PBCH block indicated by the value of the SS/PBCH block index field. The first field may correspond to a frequency domain resource assignment field. The DCI format may be DCI format 1_0 associated with a physical downlink shared channel (PDSCH) scheduling. The base station may generate second DCI for a PDSCH scheduling. The second DCI may comprise the first field having a value different from the predefined value. The base station may transmit, to the wireless device, the second DCI.

Figure 13:
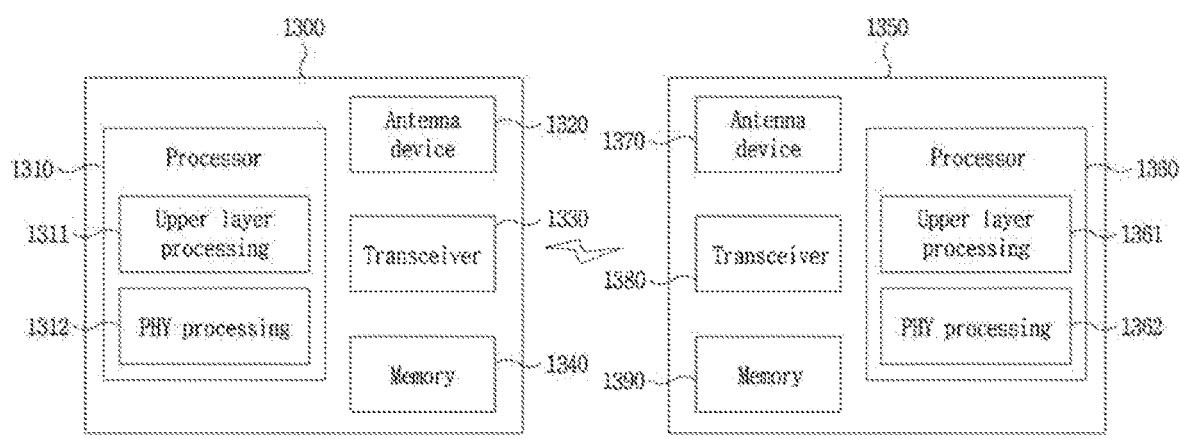
FIG. 13 is a block diagram illustrating an example of a UE and an evolved node base (eNode B).

FIG. 13 is a block diagram illustrating a UE and an eNode B.

Referring to FIG. 13, a base station device 1300 may include a processor 1310, an antenna device 1320, a transceiver 1330, and a memory 1340.

The processor 1310 may perform baseband-related signal processing and may include an upper layer processing 1311 and a physical (PHY) layer processing 1315. The upper layer processing 1311 may process an operation of a Medium Access Control (MAC) layer, a Radio Resource Control (RRC) layer, or more upper layer. The PHY layer processing 1315 may process an operation (e.g., uplink (UL) received signal processing and downlink (DL) transmission signal processing) of a PHY layer. The processor 1310 may control the overall operation of the base station device 1300 in addition to performing the baseband-related signal processing.

The antenna device 1320 may include at least one physical antenna. If the antenna device 1320 includes a plurality of antennas, multiple input multiple output (MIMO) transmission and reception may be supported. The transceiver 1330 may include a radio frequency (RF) transmitter and an RF receiver. The memory 1340 may store operated information of the processor 1310 and software, an operating system (OS), an application, etc., associated with an operation of the base station device 1300, and may include a component, for example, a buffer.

The processor 1310 of the base station device 1300 may be configured to implement an operation of a base station in the example embodiments disclosed herein.

Referring again to FIG. 13, a terminal device 1350 may include a processor 1360, an antenna device 1370, a transceiver 1380, and a memory 1390.

The processor 1360 may perform baseband-related signal processing and may include an upper layer processing 1361 and a PHY layer processing 1365. The upper layer processing 1361 may process an operation of a MAC layer, an RRC layer, or more upper layer. The PHY layer processing 1365 may process an operation (e.g., UL received signal processing and DL transmission signal processing) of a PHY layer. The processor 1360 may also control the overall operation of the terminal device 1350 in addition to performing baseband-related signal processing.

The antenna device 1370 may include at least one physical antenna. If the antenna device 1370 includes a plurality of antennas, MIMO transmission and reception may be supported. The transceiver 1380 may include an RF transmitter and an RF receiver. The memory 1390 may store operated information of the processor 1360 and software, an OS, an application, etc., associated with an operation of the terminal device 1350, and may include a component, for example, a buffer.

The processor 1360 of the terminal device 1350 may be configured to implement an operation of a terminal in the example embodiment disclosed herein.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor.

The memory may be disposed inside or outside the processor, and may be connected to the processor through various well-known means.

In the described exemplary system, although methods are described based on a flowchart as a series of steps or blocks, aspects are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present disclosure.

What is claimed is:

1. A method comprising:
receiving, by a wireless device from a base station, one or more messages comprising downlink control information (DCI) associated with a DCI format;
determining that a first field of the DCI corresponds to a predefined value;
determining that, based on the first field corresponding to the predefined value, the DCI is for a random access procedure associated with a physical downlink control channel (PDCCH) order;
determining, based on the determining that the DCI is for a random access procedure associated with a PDCCH order and based on a plurality of fields of the DCI, a random access channel (RACH) occasion associated with a synchronization signal/physical broadcasting channel (SS/PBCH) block, wherein the plurality of fields of the DCI comprise:
an SS/PBCH block index field having a value indicating the SS/PBCH block; and
a RACH index field having a value indicating one or more RACH occasions;
determining, based on the SS/PBCH block index field and the RACH index field, the RACH occasion associated with the SS/PBCH block; and
transmitting, based on the RACH occasion associated with the SS/PBCH block, a random access preamble.

2. The method of claim 1, further comprising:
receiving information associated with a location of one or more transmission SS/PBCH blocks,
wherein determining the RACH occasion comprises determining, based on the SS/PBCH block indicated by the value of the SS/PBCH block index field, the RACH occasion.

3. The method of claim 1, wherein the first field corresponds to a frequency domain resource assignment field of DCI format 1_0.

4. The method of claim 1, wherein the DCI format is DCI format 1_0 associated with a physical downlink shared channel (PDSCH) scheduling.

5. The method of claim 1, further comprising determining the DCI based on Cell Radio Network Temporary Identifier (C-RNTI).

6. The method of claim 1, wherein the DCI comprises an uplink/supplemental uplink (UL/SUL) indicator associated with the random access preamble.

7. The method of claim 2, further comprising:
receiving, from the base station, configuration information comprising one or more of:
a physical RACH (PRACH) configuration period;
a transmission SS/PBCH block-PRACH mapping configuration period; or a number of SS/PBCH blocks per RACH occasion.

8. The method of claim 1, further comprising:
determining, based on the determining that the DCI is for a random access procedure associated with a PDCCH order, an uplink/supplemental uplink (UL/SUL) indicator of the plurality of fields of the DCI,
wherein the transmitting the random access preamble comprises transmitting, based on the UL/SUL indicator, the random access preamble via an SUL carrier.

9. A method comprising:
determining, by a base station, a random access channel (RACH) occasion for a wireless device, wherein the RACH occasion is associated with a synchronization signal/physical broadcast channel (SS/PBCH) block;
generating downlink control information (DCI) corresponding to a DCI format, the DCI comprising:
a first field having a predefined value indicating that the DCI is for a random access procedure associated with a physical downlink control channel (PDCCH) order;
an SS/PBCH block index field having a value indicating the SS/PBCH block; and
an index field having a value indicating one or more RACH occasions,
wherein the RACH occasion for the wireless device is indicated by the values of the SS/PBCH block index field and the index field;
transmitting, to the wireless device, the DCI; and
receiving, from the wireless device and based on the RACH occasion, a random access preamble.

10. The method of claim 9, further comprising:
transmitting information associated with a location of one or more SS/PBCH blocks.

11. The method of claim 9, wherein the first field corresponds to a frequency domain resource assignment field of DCI format 1_0.

12. The method of claim 9, wherein the DCI format is DCI format 1_0 associated with a physical downlink shared channel (PDSCH) scheduling.

13. The method of claim 12, further comprising:
generating second DCI for a PDSCH scheduling, wherein the second DCI comprises a field having a value different from the predefined value; and
transmitting, to the wireless device, the second DCI.

14. The method of claim 9, further comprising scrambling the DCI based on Cell Radio Network Temporary Identifier (C-RNTI).

15. The method of claim 9, wherein the DCI comprises an uplink/supplemental uplink (UL/SUL) indicator associated with the random access preamble.

16. A method comprising:
receiving, by a wireless device from a base station, one or more messages comprising downlink control information (DCI);
determining that the DCI corresponds to DCI format 1_0;
determining that, based on a value of a first field of the DCI format 1_0, the DCI is for a random access procedure associated with a physical downlink control channel (PDCCH) order;
determining, based on a synchronization signal/physical broadcast channel (SS/PBCH) block index field of the DCI and based on an index field associated with one or more random access channel (RACH) occasions, a RACH occasion associated with an SS/PBCH block indicated by the SS/PBCH block index field; and
transmitting, based on the RACH occasion associated the SS/PBCH block, a random access preamble.

17. The method of claim 16, further comprising:
receiving information associated with a location of one or more SS/PBCH blocks,
wherein determining the RACH occasion comprises determining, based on the SS/PBCH block indicated by a value of the SS/PBCH block index field, the RACH occasion.

18. The method of claim 16, wherein the first field corresponds to a frequency domain resource assignment field.

19. The method of claim 16, further comprising:
receiving second DCI corresponding to the DCI format 1_0;
determining that a frequency domain resource assignment field has a value different from a predefined value, wherein the predefined value is associated with the random access procedure; and
retrieving, from the second DCI, information of a physical downlink shared channel (PDSCH) scheduling.

20. The method of claim 16, further comprising determining the DCI based on Cell Radio Network Temporary Identifier (C-RNTI).

21. The method of claim 16, wherein the DCI comprises an uplink/supplemental uplink (UL/SUL) indicator associated with the random access preamble.

* * * * *